Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 1

INVENTOR
A.L.W. WILLIAMS
BY M. J. Pinelas
ATTORNEY

Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 2

INVENTOR
A.L.W. WILLIAMS
BY M. S. Pinela
ATTORNEY

Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 3

INVENTOR.
A. L. W. WILLIAMS
BY
Eber J. Hyde
ATTORNEY

*INVENTOR.*
A.L.W. WILLIAMS
*BY*
Eber J. Hyde
ATTORNEY

Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 5

INVENTOR
ALFRED L. W. WILLIAMS
BY
Eber J. Hyde
ATTORNEY

Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 6

INVENTOR.
ALFRED L. W. WILLIAMS
BY
Elber J. Hyde
Attorneys

Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 7

INVENTOR.
ALFRED L. W. WILLIAMS
BY
Eber J. Hyde
ATTORNEYS.

INVENTOR
ALFRED L. W. WILLIAMS
BY Eber J. Hyde
ATTORNEY

Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 9

INVENTOR
ALFRED L. W. WILLIAMS
BY
Elmer J. Hyde
ATTORNEY

Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 10

INVENTOR
ALFRED L. W. WILLIAMS
BY Eber J. Hyde
ATTORNEY

Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 11

INVENTOR.
ALFRED L. W. WILLIAMS
BY
Eber J. Hyde
ATTORNEY

Sept. 4, 1951 A. L. W. WILLIAMS 2,567,092

MAGNETIC RECORDER-REPRODUCER DEVICE OF THE DISK TYPE

Filed June 7, 1947 12 Sheets-Sheet 12

INVENTOR
A.L.W. WILLIAMS
BY Pineles + Greene
ATTORNEY

Patented Sept. 4, 1951 2,567,092

UNITED STATES PATENT OFFICE 2,567,092

MAGNETIC RECORDER-REPRODUCER DEVICE OF THE DISK TYPE

Alfred L. W. Williams, Cleveland Heights, Ohio, assignor to The Brush Development Company, Cleveland, Ohio, a corporation of Ohio Application June 7, 1947, Serial No. 753,159

9 Claims. (Cl. 179—100.2)

This invention relates to magnetic recording and reproducing systems, in which magnetic signals are recorded and reproduced by a magnetic flux interlinkage between windings of a magnetic record transducer head and relatively moving elements of a magnetic recording medium engaging the pole faces of the transducer head.

This is a continuation-in-part of application Serial Number 651,637, filed March 2, 1946 by Alfred L. W. Williams for United States Patent for Magnetic Recording and Reproducing, now abandoned.

The present invention is directed to magnetic recording systems of the foregoing type, using a magnetic recording medium having an extended magnetic record surface on which signals are magnetically recorded along a succession of interconnected, continuous adjacent record traces which are tangibly indistinguishable along the record surface. Such recording medium may be formed, for instance, by a thin flexible generally flat record sheet member, similar to phonograph disc records, having an exposed endless generally circular magnetic record surface on which magnetic records are recorded along adjacent spiral record traces which are tangibly indistinguishable along the record surface. Such recording medium may also be formed, for instance, by a flexible sleeve or belt-shaped sheet member having an exposed endless record surface on which signals are recorded along adjacent helical spiral record traces which are tangibly indistinguishable along the record surface. A system of this last-mentioned type is described and claimed in application Serial Number 94,068, filed May 19, 1949 in the name of Alfred L. W. Williams.

Among the objects of the invention is a recording system in which a guide structure—having continuous guide tracks, such as spiral or helical grooves extending in the form of a succession of interconnected, adjacent, tangible guide track convolutions—is combined with a magnetic record structure of the foregoing type and a magnetic record transducer head having a stylus engaging the guide tracks so that the guide structure and the record structure shall move in unison and cause the pole faces of the record transducer head to record or reproduce magnetic records along corresponding continuous magnetic record traces of the record surface along which it is guided and advanced by reason of the guiding engagement of the stylus with the guide tracks of the guide structure, the location of the magnetic record traces being fixed and determined by the location of the guide tracks on the guide structure.

A distinct object of the invention is a magnetic recording medium of the foregoing type, combining an extended magnetic record surface with a guide track surface having tangible guide tracks which fix the location of the magnetic record traces along which magnetic signals may be recorded or played back, although the magnetic record traces are tangibly indistinguishable.

Another distinct object of the invention is a magnetic recording medium of the foregoing type provided with at least two predetermined fixed aligning elements which determine the location of the record traces along which magnetic signals may be predeterminedly recorded on the record surface, or played back therefrom by reference to said aligning elements.

The foregoing and other objects of the invention will be best understood from the following description of exemplifications thereof, reference being had to the accompanying drawings wherein:

Fig. 1 is a plan view of a magnetic record transducing system according to the invention;

Figs. 2 and 3 are sectional views taken along lines 2—2 and 3—3, respectively, of the magnetic record transducing system of Fig. 1;

Figs. 4 and 4-A are detail sectional views of the transducer of Figs. 1 and 2 taken along the lines 404 and 4-A—4-A of Fig. 2;

Figure 2:
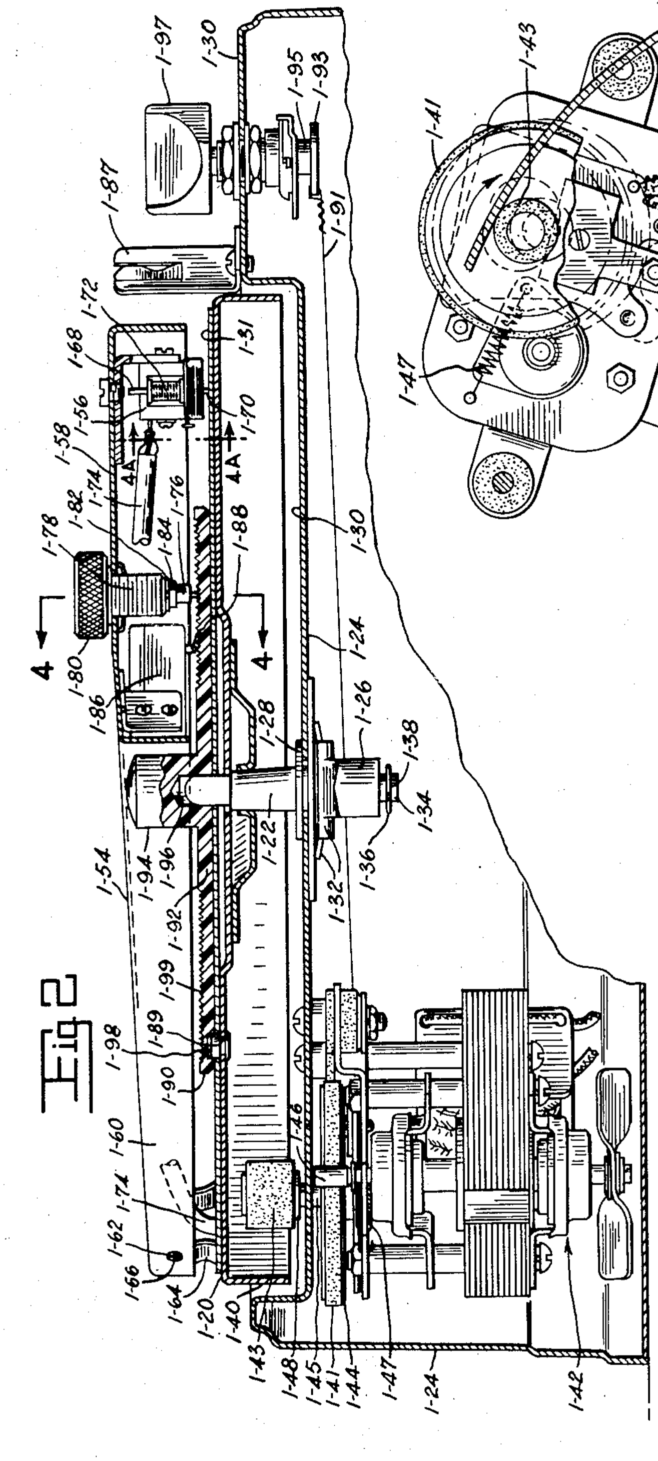
Figure 5:
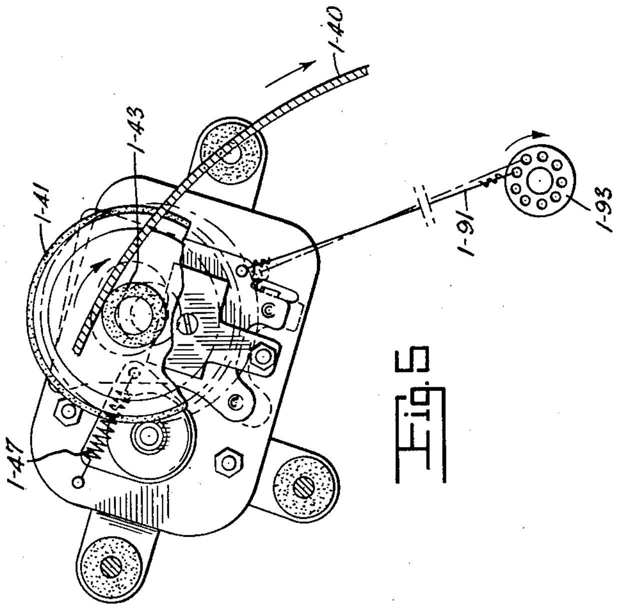
Fig. 5 is a partial top view of the transducer drive with the top of the housing removed and the turntable partially shown in section.
Figure 4:
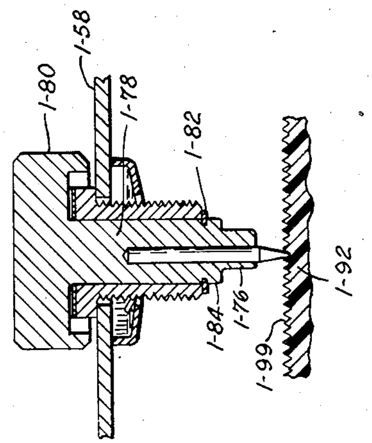
Figure 9:
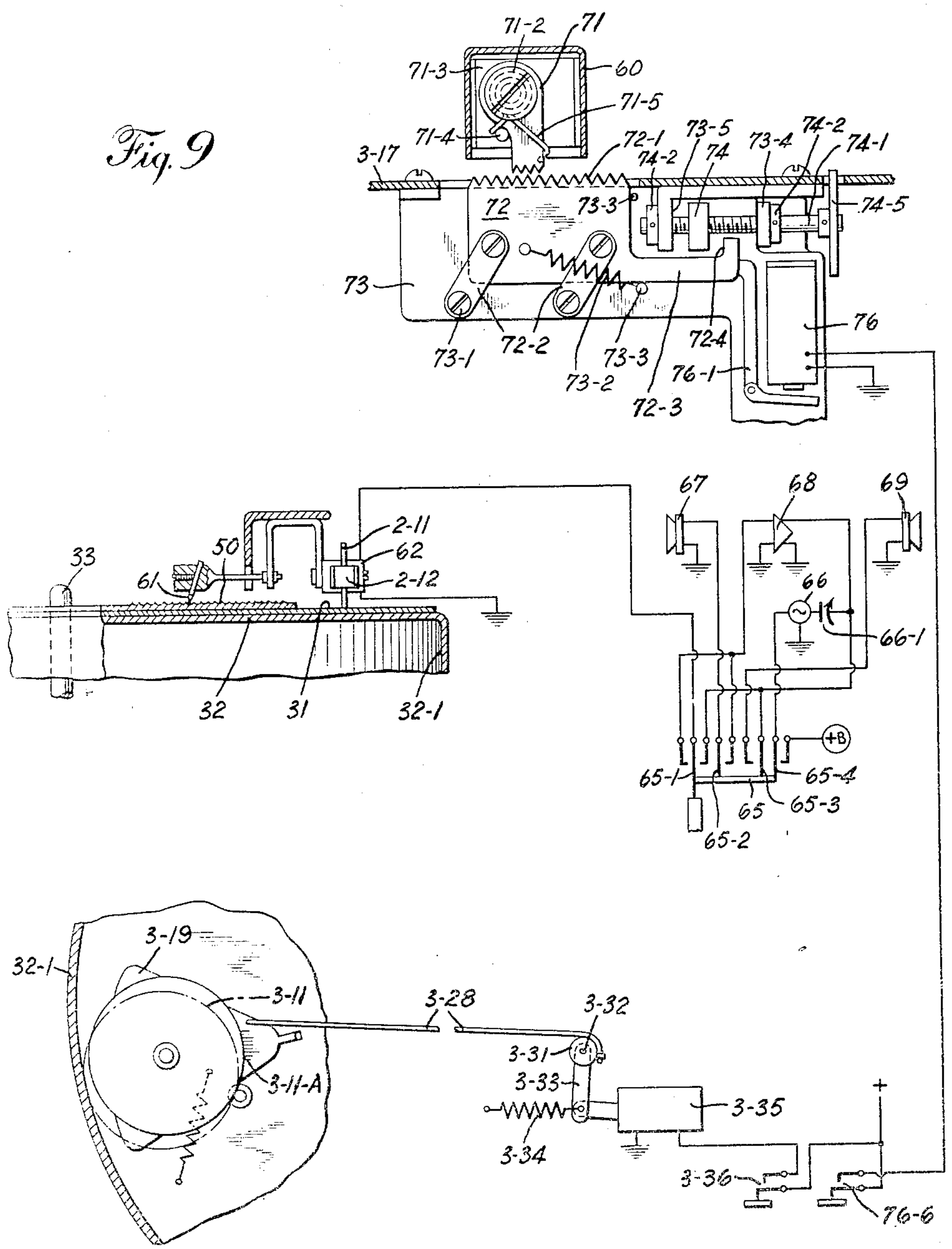
Fig. 9 is a simplified diagrammatic view illustrating the general relationship of some of the magnetic, electric and mechanical elements of another magnetic recording and reproducing system exemplifying the invention.
Figures 9A, 9B, 10, 10A:
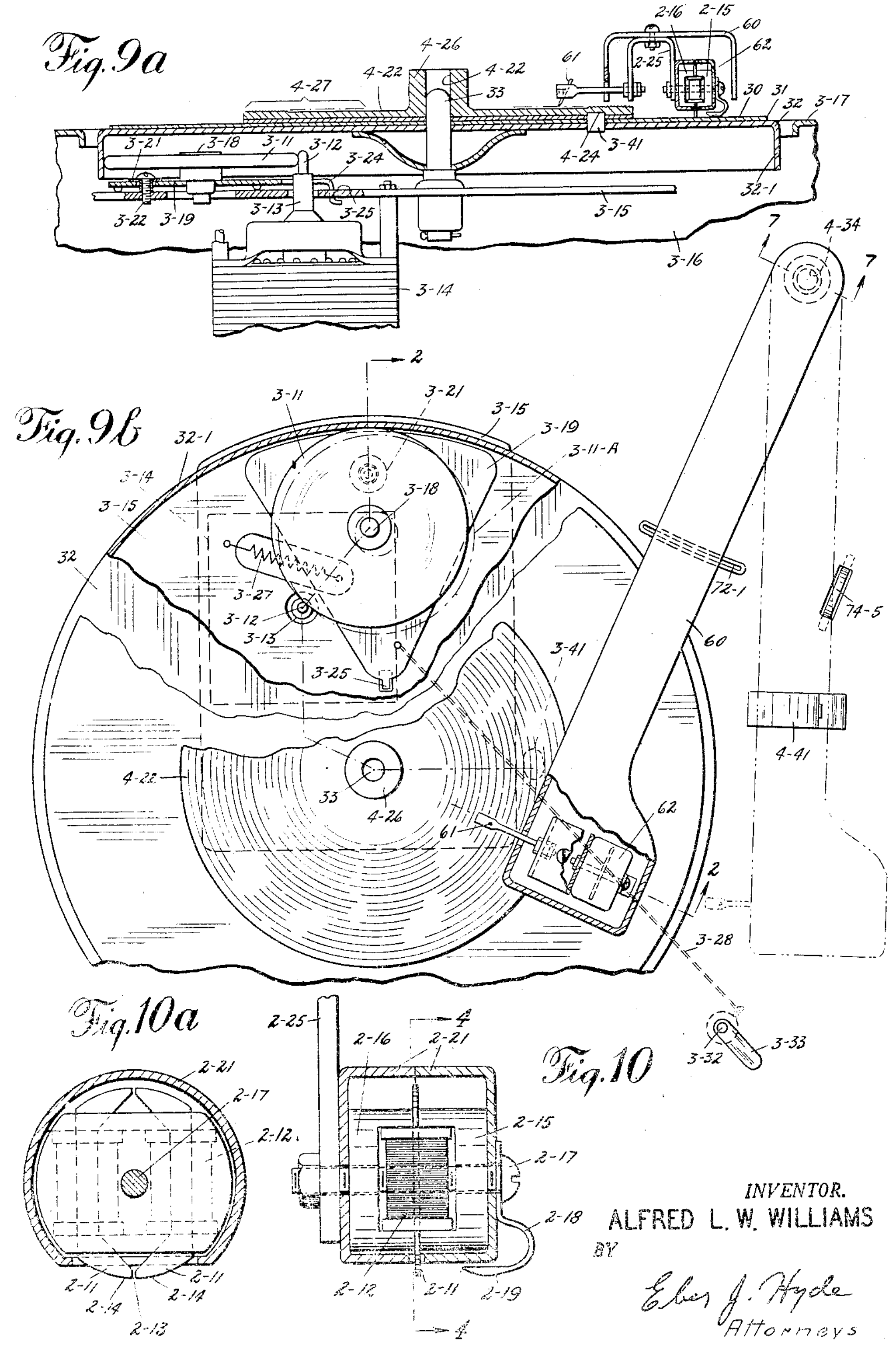
Figures 11, 11A:
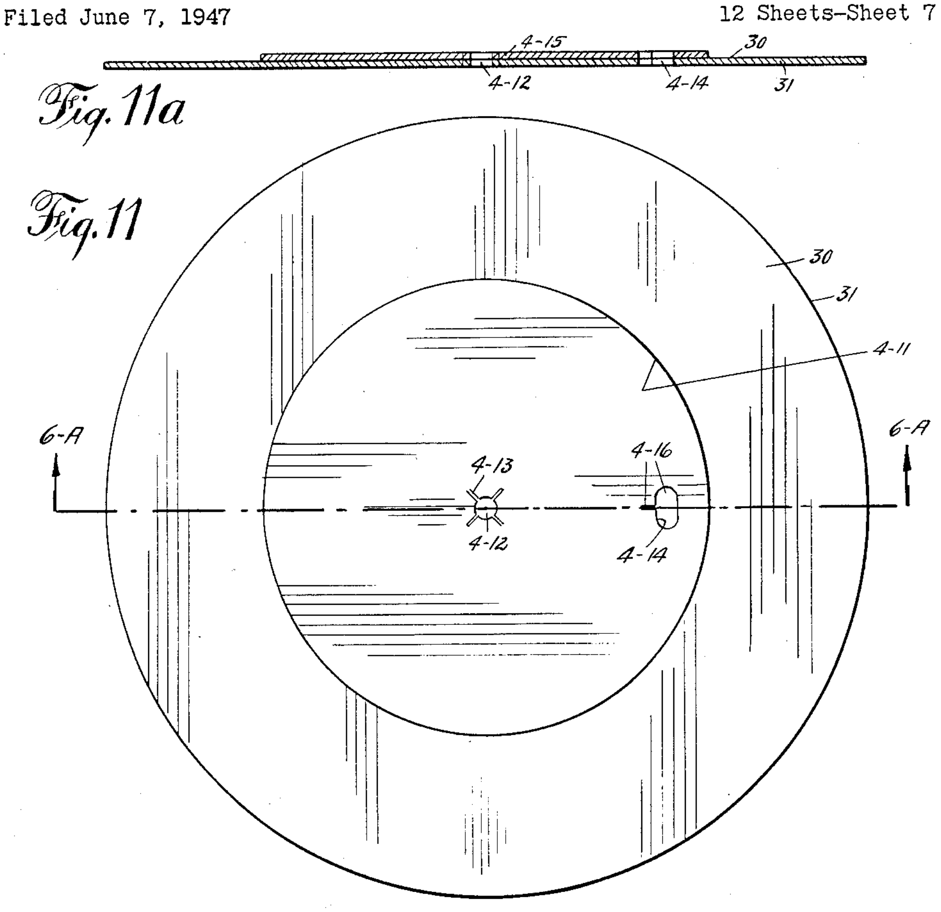
Figures 12, 12A, 12B:
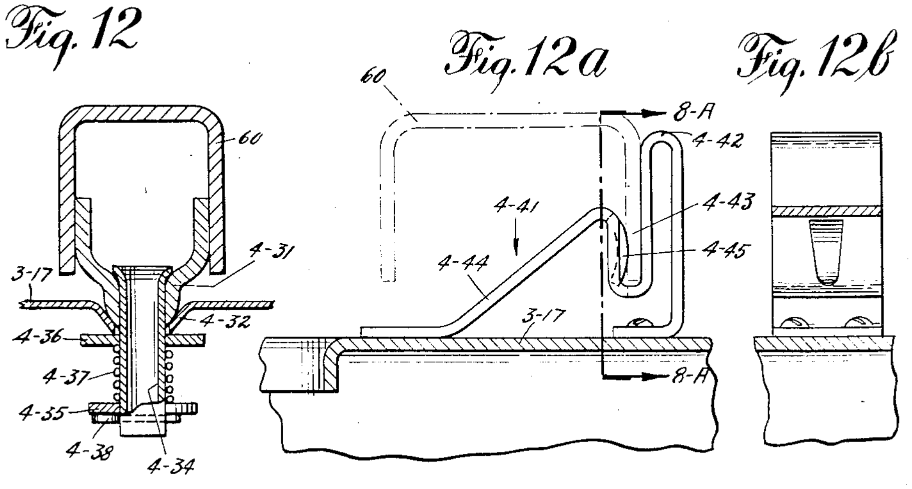
Figures 13, 13A, 14:
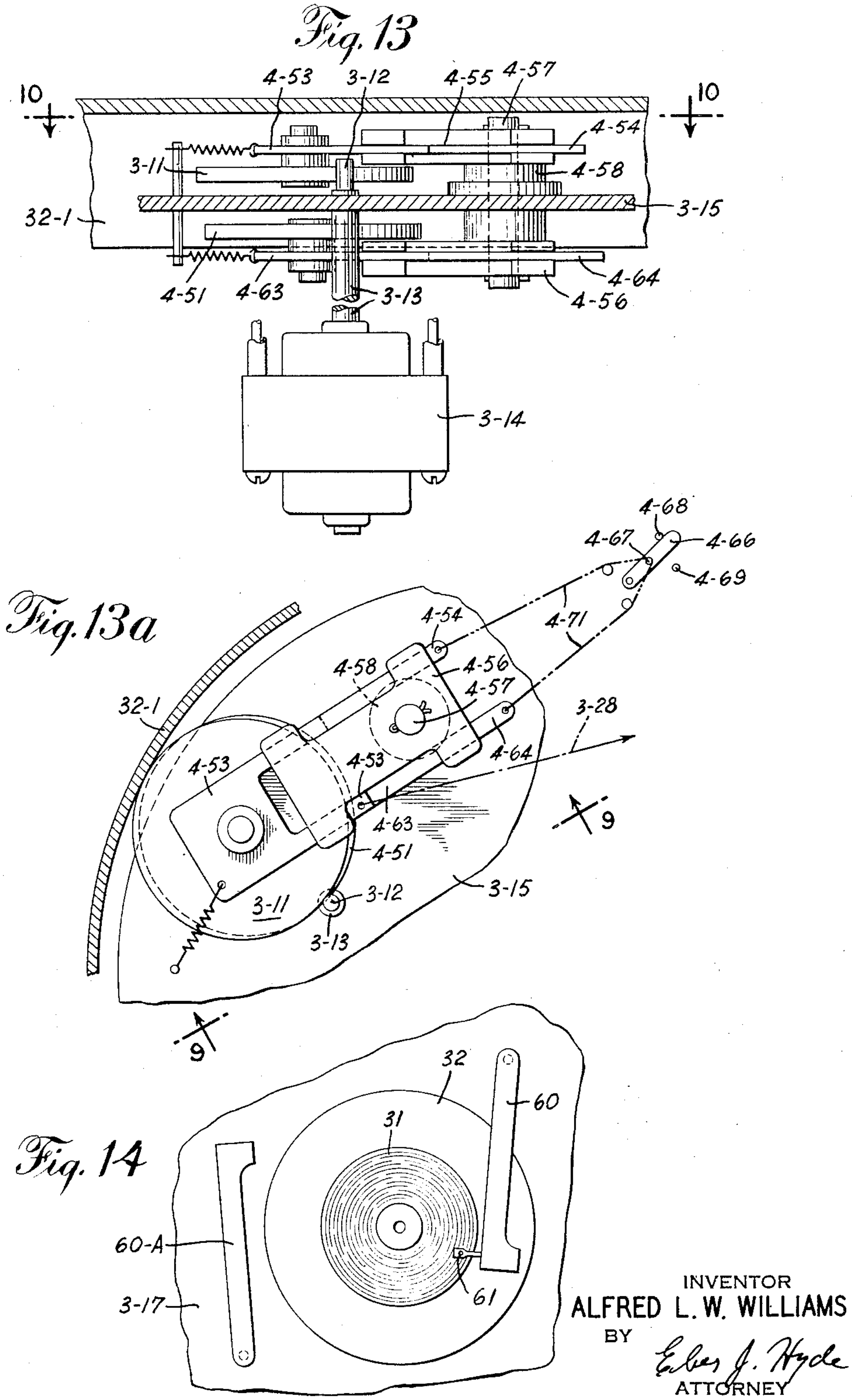
Figure 15:
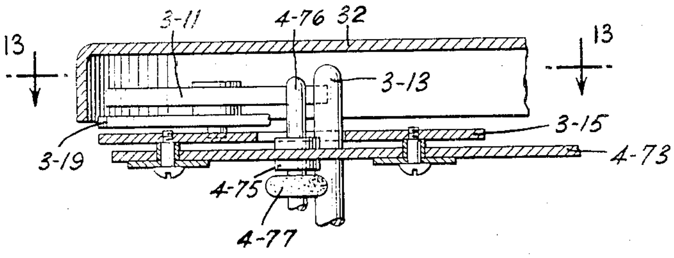
Figure 15A:
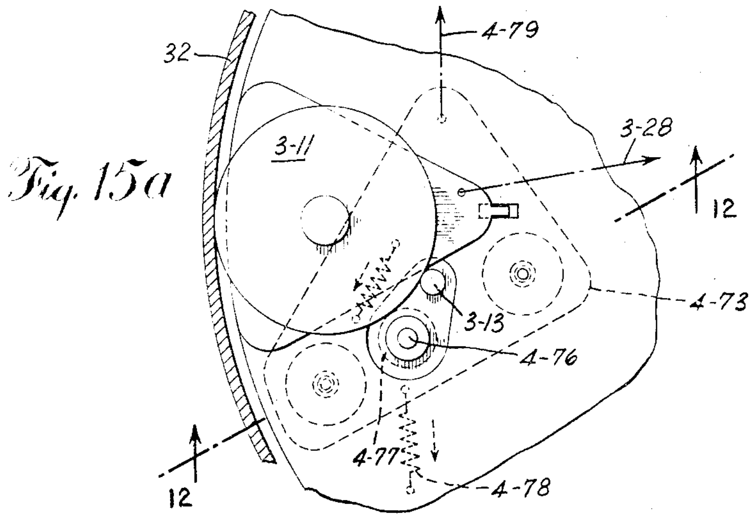
Figure 16:
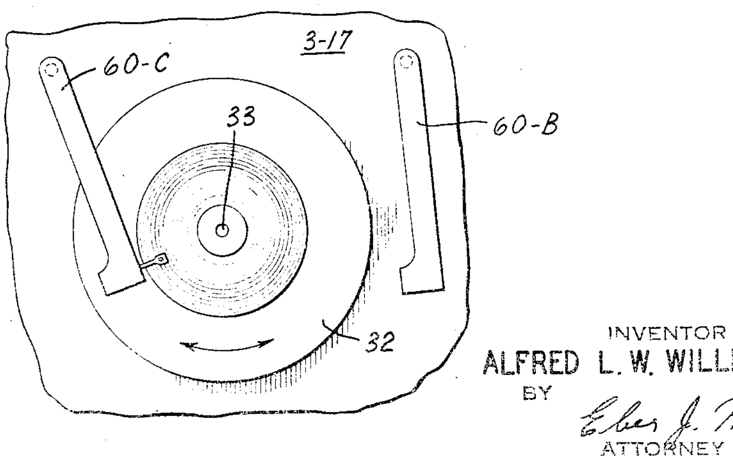
Figure 17:
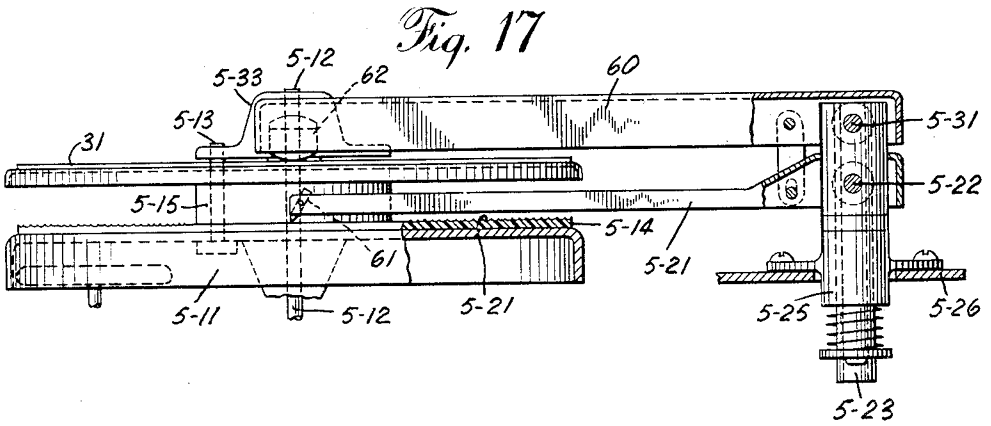
Figure 17B:
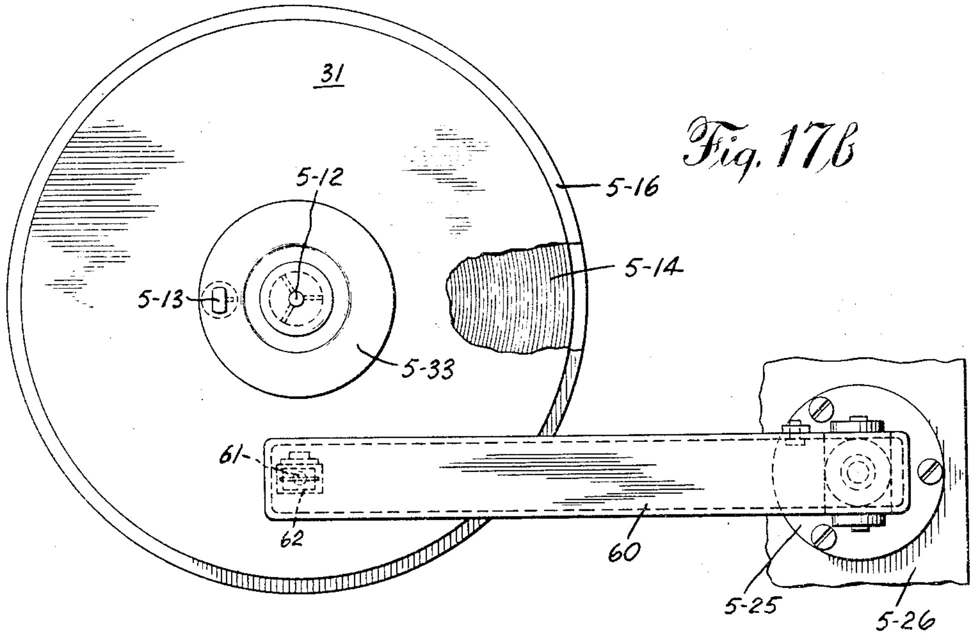
Figure 17A:
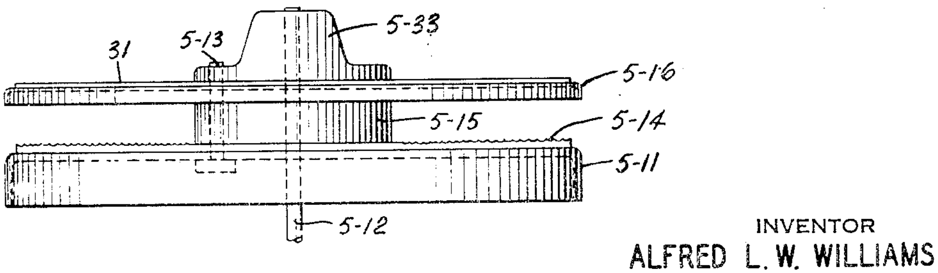
Figure 18:
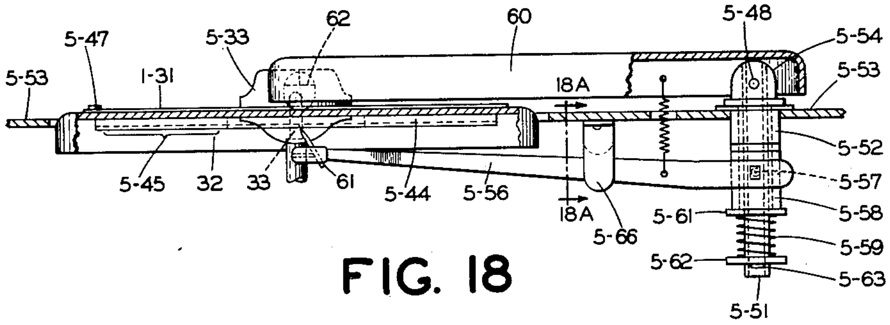
Figure 18A:
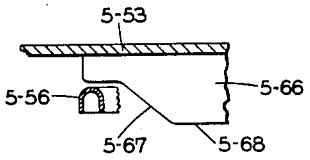
Figure 19:
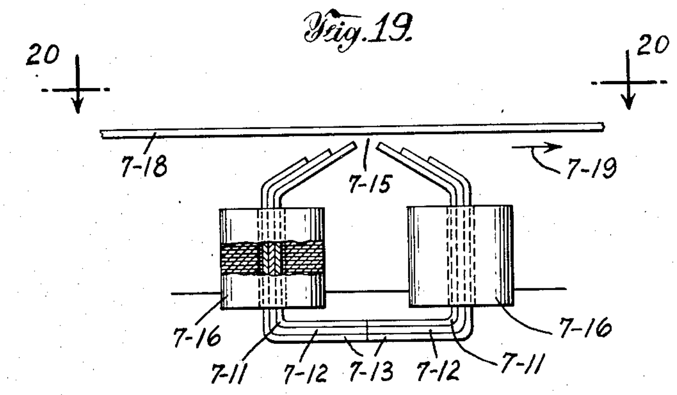
Figure 20:
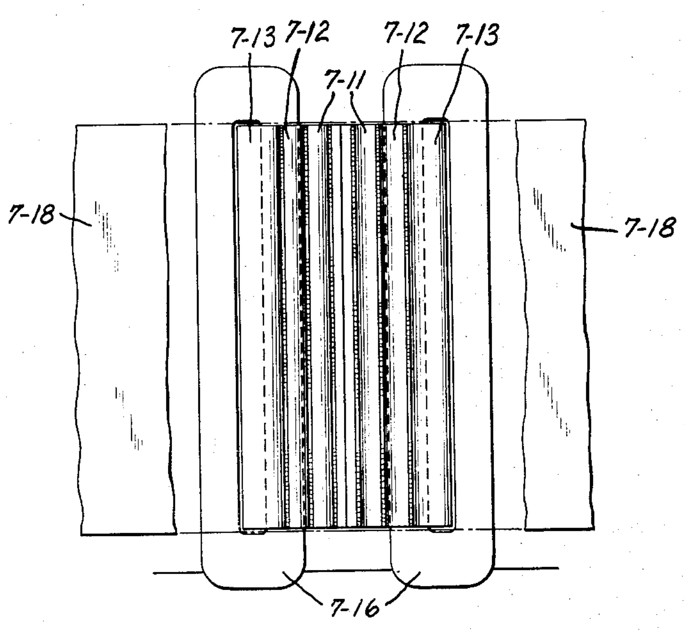

Fig. 9-A is a vertical sectional view of one form of a practical recording device according to Fig. 9, taken along line 9-A—9-A of Fig. 9-B;

Fig. 9-B is a plan view with parts broken away of the device of Fig. 9-A;

Fig. 10 is an enlarged elevational view of the magnetic head of the recording device shown in Figs. 9-A and 9-B, with part of its housing shown in section;

Fig. 10-A is a sectional view of the magnetic head shown in Fig. 10, taken along line 10-A—10-A;

Fig. 11 is a plan view of one form of record member for a recording device of Figs. 9, 9-A and 9-B;

Fig. 11-A is a cross-sectional view of the record member of Fig. 11 along line 11-A—11-A;

Fig. 12 is a cross-sectional view along line 12—12 of Fig. 9-B showing the pivotal connection of the guide arm to the top wall of the recording device;

Fig. 12-A is a cross-sectional view of a portion of the top wall with a guide arm retaining member mounted thereon for retaining the guide arm in its standby position;

Fig. 12-B is a cross-sectional view along line 12-B—12-B of Fig. 12-A;

Fig. 13 is a cross-sectional view similar to Figs. 2 and 9-A, along line 13—13 of Fig. 13-A, showing a modified form of recording device exemplifying the invention;

Fig. 13-A is a cross-sectional view along line 13-A—13-A of Fig. 13;

Fig. 14 is a plan view showing the exposed top wall of the recording device equipped with the recording mechanism of Figs. 13 and 13-A;

Fig. 15 is a cross-sectional view similar to Fig. 13, along line 15—15 of Fig. 15-A, showing a further modification of a recording device exemplifying the invention;

Fig. 15-A is a cross-sectional view along line 15-A—15-A of Fig. 15;

Fig. 16 is a plan view showing the exposed top wall of the recording device equipped with the recording mechanism of Figs. 15 and 15-A;

Fig. 17 is a front elevational view showing some of the elements of a still further form of recording device exemplifying the principles of the invention;

Fig. 17-A is an elevational view of the record supporting and guide structure of Fig. 17;

Fig. 17-B is a plan view of the elements of the recording device shown in Fig. 17 with parts broken away;

Fig. 18 is a vertical cross-sectional view of a modified form of recording device of the type shown in Fig. 17;

Fig. 18-A is a cross-sectional view along line 18-A—18-A of Fig. 18;

Figs. 19 and 20 are side and top views of a further form of record erasing structure of the invention.

Figures 1, 3, 4A:
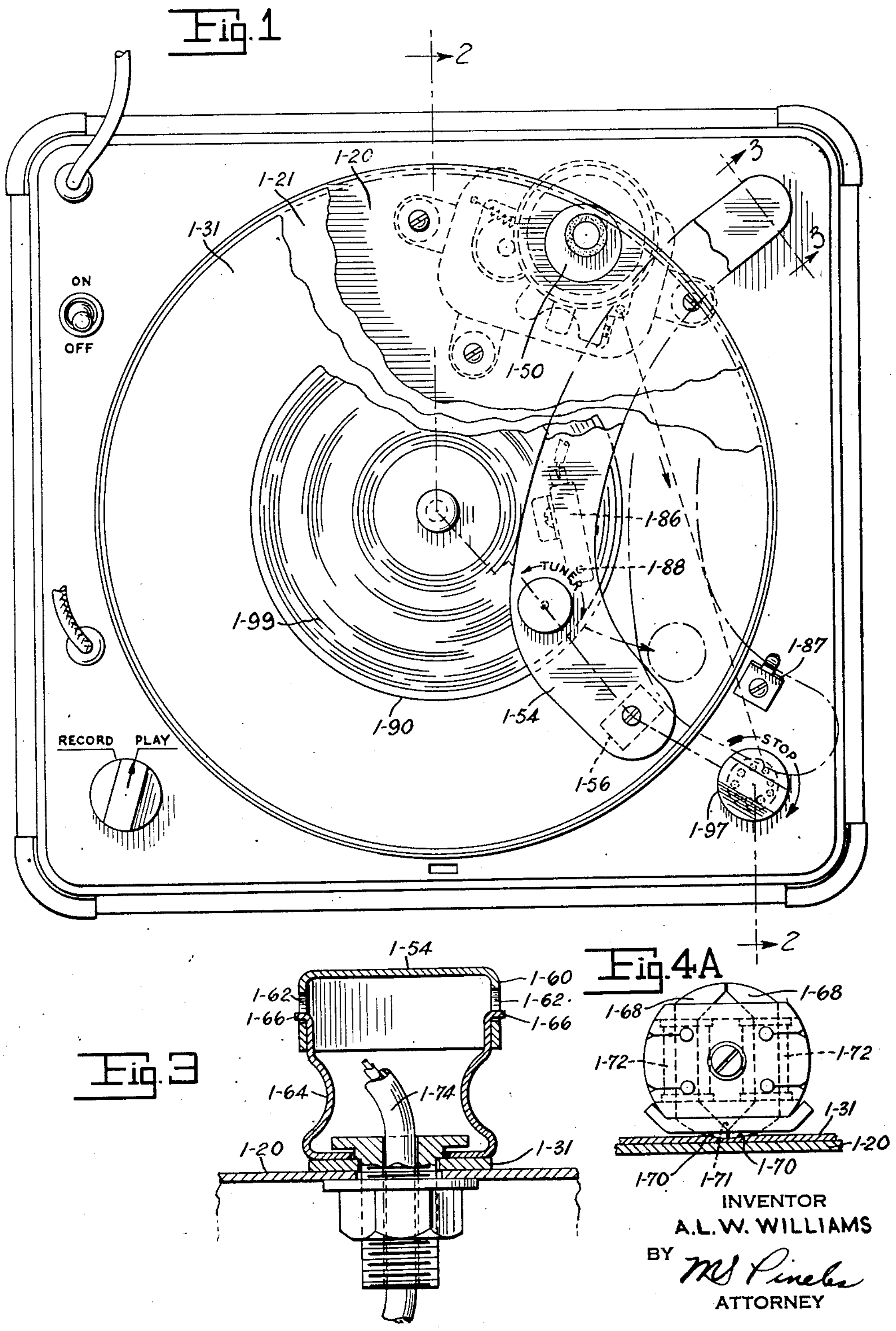

Fig. 1 illustrates one practical form of magnetic record transducing system embodying the invention. This transducer includes a rotatably mounted record member holder in the form of a table 1—20 having a central bearing support 1—22 held in place in a generally box-like housing 1—24. As shown, the bearing support 1—22 is held in a bearing socket 1—26 having a collar 1—28 and clamped to the upper surface 1—30 of the housing by the spring friction grips 1—32. The bearing support 1—22 is shown as including a lower cylindrical extension 1—34 fitting within the socket 1—26 and held against removal by a spring retainer 1—36 engaging in a slot 1—38.

The rotatably mounted table 1—20, which is quite similar to the conventional phonograph turntable, may have a depending rim 1—40 for engagement and operation by driving means shown in the form of an A. C. induction motor 1—42. The rim drive is established through the step-down friction drive including the roller 1—44 held on a slidable shaft 1—45 together with the rim engaging roller 1—48 and directly driven by the motor shaft 1—46 against which it is held in contact as by suitable bias means such as a spring 1—47. The passageway 1—50 in the housing cover 1—30 receives the slidable drive shaft 1—45. The rollers 144 and 148 are provided with resilient sleeves or tires 141 and 143 to smoothly supply power and prevent the transmission of vibrations through the drive to the turntable.

Pivotally mounted on the upper surface of the housing beside the turntable indicated at 1—52 there is shown a transducing arm 1—54 which holds a magnetic transducing head 1—56. The arm 1—54 is shown in the shape of an inverted channel having an upper wall 1—58 the ends of which are bent downwardly to provide side walls 1—60. The arm 1—54 is loosely held pivoted around a horizontal axis by openings 1—62 in the side walls 1—60 which fit over and are engaged by the ends of a generally U-shaped clip 1—64 which are bent over to form generally horizontal detents 1—66 projecting through the openings 1—62. The clip 1—64 is in turn pivotally held to the top of the housing so as to be rotatable around a vertical axis.

The transducing head 1—56 includes pole pieces 1—68, shown as formed of magnetic sheet material aligned and shaped so that their lower edges form smoothly rounded pole faces 1—70 separated by a small non-magnetic gap 1—71. Windings 1—72 surrounding the pole pieces are connected to the transducing amplifiers which may be contained within the housing 1—24 by means of the shielded cable 1—74 fitted within the channel of arm 1—54 and passing through the bottom of the clip 1—64 and through the top of the housing 1—30.

The transducing arm 1—54 which in plan view is curved, as indicated in Fig. 1, has affixed thereto in its intermediate portion a guide pin 1—74 rotatably mounted in a pin socket 1—78 which is anchored to the upper wall 1—58 of the arm. The upper end of the guide pin 1—76 projects above the arm and is enlarged to form a manually rotatable head 1—80, and the pin is held in place by a split spring ring 1—82 fitted in a peripheral slot 1—84 in the body portion of the guide pin 1—76.

The arm openings 1—62 are shaped to loosely receive the clip detents 1—66 thereby permitting some turning of the transducing arm 1—54 around its longitudinal axis with respect to the housing and turntable in addition to the tilting of the arm 1—54 around the horizontal axis defined by the detents.

In the form shown, the arm may also hold switch means shown as micro-switch 1—86 suitably held and having a vertically movable sensing member 1—88 projecting below the arm, as shown.

The turntable 1—20 which may be covered with a layer of flock 1—21 in a manner similar to conventional phonograph tables has a short aligning pin 1—89 projecting upwardly and fixedly held intermediate its center and outer edge. A guide disc 1—90 having a circular sheet-like body portion 1—92 and a centrally raised grip boss 1—94 has a central mounting socket 1—96 and an aligning recess 1—98 by means of which it may be centrally fitted over the turntable on the upwardly projecting end of the bearing support 1—22 and held in fixed relation to the turntable by the aligning pin 1—89. The upper surface of the aligning disc is shaped to form a guide groove 1—99 which may be in the form of a generally continuous spiral for receiving and guiding the lower projecting end of guide pin 1—76.

For transducing recordings, a disc-like record member 1—31, shown in detail in Fig. 3, having a central opening 1—33 and an aligning opening 1—35 is mounted on the turntable and aligned by fitting the openings 1—33, 1—35 over the corresponding pins 1—22, 1—89 and held in place by then placing the guide disc over the record member 1—31 and mounting and aligning it as shown. The arm 1—54 is then manually placed in a position such that the pole faces 1—70 of the magnetic head 1—56 contact the upper surface of the record member while the lower end of the guide pin 1—76 engages and fits in a portion of the guide groove 1—99. Actuation of the rim drive will then cause the turntable to rotate and carry with it the record member 1—31 and guide disc 1—90 while the guide pin 1—76 causes the transducing arm 1—54 to be fed in a generally radial direction with respect to the turntable, pivoting around a vertical axis at 1—52. The guide groove 1—99 may be so arranged that the feeding movement of the arm is outwardly from the center of the guide disc so that the pole faces of the magnetic core 1—56 scan the upper surface of the record member 1—31 along a generally spiral scanning track.

To ensure the proper aligning of the scanning trace of the record member with the actual position of a recording thereon, the guide pin 1—76 may have its lowermost point eccentrically positioned so that manual rotation of the head 1—80 can be used to adjust the position of the pole faces with respect to the guide groove 1—99 and also with respect to the surface of the record member 1—31.

The switch 1—86 is shown as so mounted that its sensing element 1—88, which is downwardly biased, is held up in the switch closing position shown in Fig. 2 during transducing operation by the upper surface of the guide disc 1—90. However, when the transducing is completed and the transducing arm 1—54 is in its outermost position, the sensing member is moved far enough so that it projects beyond the outer edge of the guide disc so that the sensing element 1—88 is free to move downwardly and open the switch. The switch may be connected to stop the rim drive as by opening the supply circuit to the driving motor 1—42.

Manually operable means may also be provided for interrupting the rim drive when desired. As shown, this control may be in the form of a knob 1—97 rotatably mounted on a shaft 1—95 pivotally held on the upper wall 1—30 of the housing and having a flange 1—93 connected as by link 1—91 to the slidable holder of the movable shaft 1—45. An arm rest shown in the form of a clip 1—87 is mounted to receive and grippingly engage a side wall 1—60 of the tone arm when retracted into the position shown in the dot-dash lines in Fig. 1.

The knob 1—97 may be operated to interrupt the turntable drive when the apparatus is in use by rotating the knob far enough to cause the link 1—91 to pull the slide plate holding the slidable shaft 1—45 away against the action of the bias 1—47 so that the roller 1—48 is disengaged from contact with the rim 1—40. The small amount of resistance to which the turntable is subjected by contact with the guide pin and transducing core 1—56 of the arm 1—54 is sufficient to immediately stop the turntable when the driving contact is broken. The rollers 1—44 and 1—48 may be kept in rotatory motion during the interruption of the turntable drive by maintaining the driven engagement of roller 1—44 with the motor drive shaft 1—46 under the biasing influence of the spring 1—47 in spite of the sliding of the rollers toward the knob 1—97 and away from driving engagement with the rim 1—40. Such maintenance of motion enables prompt acceleration of the turntable to proper operating speed when the transducing operation is continued after an interruption inasmuch as the rotational inertia of the idling rollers will not add to the rotational inertia of the turntable.

A simple interruption of the power supply for motor 1—42 may also be used for interrupting transducings without materially lengthening the duration of the turntable deceleration and acceleration periods.

Transducing operations are initiated by mounting the record member 1—31 in place, as indicated above, and then lifting and carrying the free end of the transducer arm 1—54 inwardly towards the center of the turntable until it engages the knob 1—94 of the guide disc and further inward motion is prevented. This knob 1—94 is so shaped that it acts as a stop for the transducing arm and automatically determines the portion of the record member engaged by the pole faces 1—70 of the tranducing core for the commencement of the tranducing operation. After bringing the transducing arm over as far as the knob will permit, the free end of the arm is lowered to bring the pole faces into engagement with the record member. The loose pivoting of the transducing arm at the clip automatically permits the arm to longitudinally tilt and adjust itself so that the lower end of the guide pin 1—76 also rests against the upper surface of the guide disc 1—90. The weight of the transducing arm and its attached openings is so distributed and the loosely held pivotal connection at the clip detents 1—62 is so adjusted that the lower end of the pin is held against the upper surface of the guide disc by a force sufficient to assure the proper guiding of the pin along the spiral guide channel 1—99, while at the same time the pole faces of the transducing core 1—56 are held against the record member by a small force, of the order of several grams, sufficient to establish effective magnetic interlinkage with the record track. Additionally, the yieldable layer 1—21 together with the loose pivoting of the transducer arm are arranged to permit a yieldable flexing of the record member 1—31 where it is engaged by the pole faces 1—70 by the small contacting force so that the convex pole faces are engaged along an elongated portion with a record track. This yieldable contact feature assures positive interlinkage with the diminutive non-magnetic gap of the pole faces in spite of minor variations in the exact positioning of this gap with respect to the record track, as more fully explained and claimed in United States Letters Patent 2,535,480, issued on December 26, 1950, to Semi J. Begun on application Serial No. 612,728, filed August 27, 1945.

At the same time, as the transducing arm is lowered into operating contact at the initiation of a transducing operation, the sensing member 1—88 of limit switch 1—86 is inwardly actuated by contact with the upper surface of the guide disc and may be connected in the driving motor supply line to automatically energize the driving motor and begin the transducing. Rotation of the turntable and guide disc causes the guide pin 1—76 to follow the guide channel 1—99, thereby causing the pole faces 1—70 to trace a spiral path over the record member 1—31. The switch 1—86 is so arranged that when the transducing operation is about finished, sensing member 1—88 carried outwardly by the transducing arm is brought beyond the edge of the guide disc 1—90 permitting the downwardly biased sensing member to move downwardly opening the energizing circuit of the drive motor 1—42 and promptly stopping the transducing.

Figure 7:
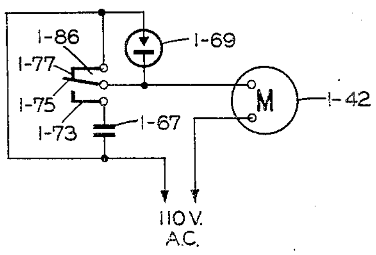
Fig. 7 is a schematic showing of one form of transducer drive control.

Fig. 7 shows one arrangement for operation of limit switch 1—86. The switch as here shown is of the single-pole double-throw type, one contact 1—77 being connected to the supply, such as the conventional alternating current power line, to directly energize the motor 1—42 through the switch blade 1—75, the circuit being completed through the other connector shown. A rectifier 1—69, such as a small selenium rectifier, is connected between the contact 1—77 and the blade 1—75 for supplying D. C. to the motor when the switch blade 1—75 is withdrawn from engagement with contact 1—77. A filter, such as the capacitor 1—67 is connected to the other contact 1—73 of the switch so that engagement of the blade in its downward position with the contact 1—73 effects filtering of the rectified output of rectifier 1—69. The switch 1—86 may be of the snap type requiring very little force for actuation from one position to the other and commercially known as microswitch. During transducing the switch blade 1—75 is held against its upper contact 1—77 to supply the energizing current for the motor 1—42 which may be of the conventional A. C. induction type ordinarily used on phonographs. The completion of the recording frees the upwardly held switch blade 1—75 so that it snaps downwardly engaging its lower contact 1—73, thereby completing a circuit for establishing a filtered D. C. feed to windings of the drive motor. As explained and claimed in United States Letters Patent 2,535,486 issued on December 26, 1950, to Alfred P. Dank on application Serial No. 680,878, filed August 16, 1946, the passage of D. C. through the windings of such a motor establishes a braking action which rapidly decelerates the motor shaft and quickly brings it to a halt.

Figure 8:
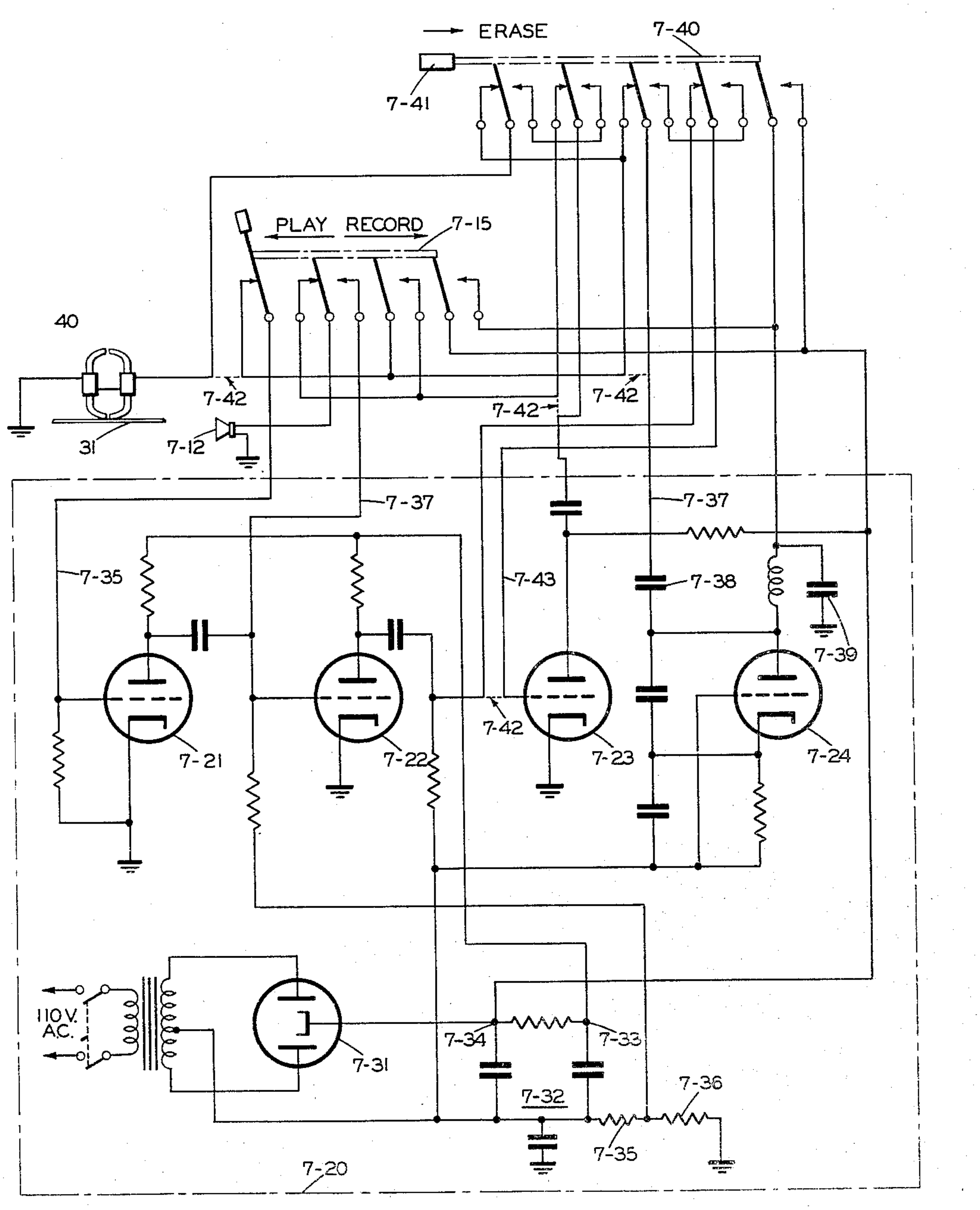
Fig. 8 is a schematic showing of a transducing circuit with which the apparatus may be operated.

Fig. 8 shows the general relationship of one practical form of a magnetic record transducing apparatus and its circuit elements utilizing a single magnetic head for recording, playback and erasing undesired portions of recorded matter along selected parts of record traces by means of the same oscillator which supplies the high frequency bias during the recording process, and utilizing one of the amplifying stages of the playback or recording amplifier circuit for amplifying the oscillations of the bias supply source in order to enable the amplified high frequency currents of the bias source to effect the desired erasure of signals magnetically recorded along the record trace.

The magnetic record reproducing device shown diagrammatically in Fig. 8 comprises a magnetic head 1—56, such as described above, arranged to record signals along a magnetic record trace of a moving magnetic record sheet member 1—31; a single sound transducer device 7—12 serving both as a microphone during the recording process and as a sound reproducer or loudspeaker device during the playback process; a control switch 7—15 for selectively establishing playback and recording circuit conditions; and a circuit network generally designated 7—20, including the elements of the amplifier bias supply source and the electric power supply for the amplifier and bias supply source.

The sound transducer 7—12 is of a conventionally known type which performs the function of a microphone in converting sound signals reaching it into corresponding electric signals, and as a sound reproducer in converting electric signals supplied thereto into sound. Either a piezoelectric crystal sound transducer or a voice coil type electro-magnetic sound transducer may be used.

The circuit network 7—20 has three amplifier stages associated with the vacuum tube amplifier elements 7—21, 7—22, 7—23 and a bias oscillator stage associated with amplifier vacuum tube element 7—24.

The amplifier stages of the tubes 7—21, 7—22 and 7—23 are arranged to operate in cascade as a three stage amplifier during the playback process, the several amplifier stages being arranged to be resistance coupled to each other. During the recording process only two of the amplifier stages associated with the tube elements 7—22, 7—23 are utilized to amplify the signals supplied by the sound transducer 7—12 operating as a microphone and delivering the required recording currents to the windings of the magnetic head 40. During the recording process the magnetic head is also supplied with the required high frequency oscillatory bias currents produced by the oscillator stage associated with the tube element 7—24, the electrodes of which interconnect with the circuit elements shown and selected so as to generate high frequency oscillations of the order of about 30 k. c., for instance. The electric operating energy is supplied to the amplifier stages and the oscillator stage by a power supply source shown as a two-phase rectifier tube 7—31 which is supplied through a conventionally connected transformer to a domestic current supply source, for instance, of 110 v. A. C., the rectifier alternating current being provided with a filter network 7—32 delivering highly filtered D. C. at terminal 7—33, and less filtered D. C. at terminal 7—34. To the highly filtered D. C. B+ supply filter terminal 7—33 are connected the plate circuits of the initial amplifier stages of tube elements 7—21, 7—22. To the less filtered D. C. B+ supply filter terminal 7—34 are connected the plate circuits of the output amplifier stage of tube element 7—23 and of the oscillator stage tube element 7—24. The filter circuit includes also additional resistance element 7—35 to provide the required operating bias for the input grid of the amplifier tube elements 7—22, 7—23, 7—24.

The record-playback switch 7—15 is shown as being of the conventional type and its contact blades may be actuated either to the playback position, in which it is shown, or to the opposite recording position. There is also shown an additional multi-blade contact switch 7—40 which may be of the type which keeps its contact blades normally biased to the position shown, the blades being brought to the opposite operative position anly when suitably actuated as by pressing a bushbutton indicated at 7—41.

Further features of the magnetic recording device shown diagrammatically in Fig. 8 will appear from the following description of its operation.

It is assumed that the erase switch 7—40 remains in the non-operative position shown, in which position its contacts bridge over complete bridging or jumper connections between the circuit portions indicated by the U-shaped dash line jumper connections designated 7—42.

With the record-playback switch 7—15 in the playback position shown its fourth movable contractor elements establish the following circuit connections which provide for the playback of magnetically recorded signals. The ungrounded lead from the windings of the magnetic head 1—56 is connected through the first contact member of the switch to the input lead 7—35 of tube element 7—21 of the first amplifier stage. The signal input supplied by the magnetic head is amplified by the three cascade connected amplifier stages of tube units 7—21, 7—22, and 7—23, the amplified output being supplied by way of output lead 7—36 of tube unit 7—23, and the second contactor of the selector switch 7—15 to the sound transducer device 7—12, which delivers sound output corresponding to the electric signals impressed thereon, the circuit connection being completed by the ground connections shown. The playback operation proceeds as long as the recording medium 1—31 moves relatively to the head 1—56 while the selector control switch 7—15 remains in playback position. Throughout such playback operation the oscillator associated with the tube unit 7—24 remains de-energized.

When the selector switch 7—15 is operated to the opposite recording position its contact blades establish the following circuit connections. In the recording position the sound transducer device 7—12, which now operates as a microphone, is connected through the second contact blade of the selector switch 7—15 to the input lead 7—37 connected to the input grid of the second amplifier stage of tube unit 7—22—which operates during the recording operation as the first amplifier stage, and the output of which, after amplification by the output amplifier tube unit 7—23, is impressed through the output lead 7—36 by way of the third contact of the selector switch 7—15 in its right-hand position to one terminal of the winding of the transducer head 1—56, the circuit being completed through the ground connections shown so as to impress upon the windings of the record translucing head 40 currents which produce in the effective gap region of the head the desired magnetic recording flux.

In the right-hand position of the selector switch 7—15 its fourth contact blade connects the B+ supply terminal 7—34 to the plate circuit of the oscillator tube 7—24 and causes it to produce and deliver the required high frequency bias oscillations. The oscillating circuits of the bias oscillator tube unit 7—24 have an output lead 7—37, including a condenser 7—38, through which the proper component of high frequency biasing current is supplied by way of its connection to the third contact blade of the selector switch to the windings of the transducer head 1—56 so as to produce in the effective magnetic gap region of the head the proper component of high frequency alternating biasing flux. The coupling condenser 7—38 in the oscillator output lead and the other circuit elements of the system are so designed as to make a suitable component of the high frequency oscillations produced by the oscillator tube unit 7—24 with the amplifier signal current supplied by the microphone transducer 7—12 in such manner as to induce in the effective gap region of the recording head 1—56 the desired combination of the signal recording flux and the superimposed high frequency biasing flux component. It will be noted trat with the circuit arrangement shown the output lead 7—37 of the single oscillator stage remains connected to the windings of the recording playback head 40 not only during a recording operation but also during the playback operation. As shown, an additional condenser 7—39 is connected across the B+ supply lead connection to the plate circuit of the oscillator tube unit 7—24, this condenser 7—39 serving as a capacitive energy storing device which, in conjunction with the other elements of the oscillator circuit, operates to impress upon the windings of the magnetic transducer head 3—45 a decaying high frequency oscillating current of such character as to automatically effect a neutralization of the magnetic core of the transducer head whenever a recording operation is stopped, either by the de-energization of the recording circuits or by actuation of the selector switch 7—15 from the righthand recording position to the lefthand playback position.

With such arrangement the oscillator associated with the tube unt 7—24 continues to produce high frequency oscillating current and continues to supply them to the windings of the magnetic head 40 after the plate circuit of the tube has been disconnected from the B+ supply lead, the oscillating current so supplied to the head decaying within a few oscillating cycles and thereby neutralizing the magnetic core of the head. With the arrangement shown the oscillator stage associated with the oscillator tube unit 7—24 is loaded during a recording operation both by the windings of the magnetic head 1—56 as well as by the circuit elements of the amplifier output stage of tube unit 7—23 to which it is connected by the third contact blade of the selector switch 7—15, and the oscillator circuit is so adjusted as to provide an oscillating output of the proper biasing level when the oscillator stage is subjected to such compound loading.

The circuit elements of the system may be readily so designed that when the selector switch 7—15 is moved from the recording position to the play position, the oscillator output lead 7—37 is disconnected from the amplifier output lead 7—36, thereby decreasing the oscillator load and causing the oscillator output to increase or surge up from the bias level to a level high enough for supplying to the windings of the magnetic head 1—56 oscillating current sufficient to saturate the magnetic core of the head and bring about its magnetic neutralization by a succession of decaying oscillating cycles.

To secure effective erasing action under such operating conditions, the elements of the selector switch 7—15 may be so adjusted that when actuated from the record to the playback position its third contact blade operates first to open the connection of the oscillator output lead from the amplifier output lead before the fourth contact blade opens the plate circuit of the oscillator tube to the B+ supply circuit. In most instances, any residual permanent magnetism of the magnetic core of a magnetic head is sufficiently low as to make it possible to effect its neutralization after the end of a recording operation by a decaying oscillating current, the first magnetizing cycle of which is below the level required for saturating the magnetic core of the head. In other words, the initial or highest level of the demagnetizing current that has to be supplied by the bias oscillator stage to the magnetic head at the end of a recording cycle need not be high enough to completely saturate the magnetic core, and the surge level of the highly saturated load output need not be very much higher than the bias level in order to secure effective demagnetization of the head at the end of a recording operation.

Without limiting the scope of the invention, but in order to enable ready practice of the invention, there are given below data of one form of magnetic recording device of the type shown in Fig. 8 which is now on the market and serves as a low cost speech dictating device.

The magnetic head 1—56 is of the type shown in United States Letters Patent, 2,513,617 issued to Semi J. Begun on July 4, 1950 on application Serial No. 688,738 filed August 6, 1946, or United States Letters Patient 2,523,576 issued on September 26, 1950 to Otto Kornei on application, Serial No. 688,034, fiiled August 2, 1946. The two tube units 7—21, 7—22 form parts of a single tube type 6SL7-GT. The tube units 7—23, 7—24 form part of a single tube 6SN7-GT. Rectifier tube 7—31 is a type 6X6-GT/G tube. The plate circuit of the oscillator tube unit 7—24 includes a reactance of 30 millihenries. The magnetic record transducing device shown is being sold on the market under the trade name "Mail-A-Voice."

In accordance with the invention, a generally simple magnetic record transducing device of the type described above is combined with a simple erasure control arrangement which makes it possible to utilize the single head 1—56, which is used for carrying on, playing back and recording operations with a high frequency oscillating current of a greater level than normally supplied by the oscillator in order to make it possible to erase a selected portion of a record made by the recording head while the sequence control switch 7—15 is either in the recording operation or in the playback operation. In the arrangement of Fig. 8 the additional erase control switch 7—40 is provided to selectively interrupt either a playback or a recording operation and establish circuit connections by means of which the oscillator stage is maintained in an oscillating condition, and its oscillating output is impressed on one or more amplifying stages of the amplifier in such manner as to supply amplified high frequency oscillation to the windings of the recording head sufficient for producing in the effective gap region of the magnetic core of the head a high frequency erasing flux required for erasing records made by or during a previous recording operation. As stated before, the erasing switch 7—40 may be for the type shown and its blades may be permanently biased to establish the bridging connection shown which make it possible to carry on either playback operation or recording operation under the control of the selector switch 7—15. The erasing switch 7—40 is, however, effective to at any time interrupt a recording operation and to establish the following erasing circuit connections to the head when its contact blades are actuated to a right-hand operative position as seen in Fig. 7. In the right-hand operating position the erasing switch 7—40 wlil establish the following operating condition. Its fifth right-hand contact blade in the right-hand position connects the plate circuit of the oscillator tube unit 7—24 to the B+ terminal 7—34, thereby energizing the oscillator stage and causing it to generate the high frequency oscillations. The third and fourth right-hand contact blades of switch 7—40 in the right-hand position connects the output lead 7—37 of the single oscillator stage tube unit 7—24 to the input lead 7—43 of the last amplifier stage of tube unit 7—22 and disconnects them from their normal circuit connections in order to impress on the output lead 7—36 of the amplifier output stage amplified high frequency oscillating current of the magnitude required for producing with the magnetic head 1—56 the desired erasing flux.

The output lead 7—36 of the output amplifier tube 7—23 is connected by the first and second contact blades of the erasing switch 7—40 in their right-hand position to the windings of the record transducing head 1—56 for supplying it with the amplified high frequency oscillations of a level sufficient to produce in its effective gap region the required erasing flux. The erasing switch 7—40 may be conveniently mounted on one of the readily accessible walls of the recording device so that any time during a recording operation or playback operation a desired portion of a recorded record trace may be erased by momentarily actuating the erasing switch 7—40 from the reelase position to an operative right-hand position shown. Although the erasing switch 7—40 shown is indicated as one which is manually operated, it may obviously be remotely controlled as by combining it with a relay or solenoid which is arranged to operate its contacts from one position to another.

When signals are magnetically recorded on narrow adjacent longitudinal traces of a continuous magnetic record surface, such as a sheet member 31 described above, difficulties are encountered in playing back the magnetically recorded signals because the magnetic wave elements formed by the recorded signals along the adjacent record traces of the recording surface produce spreading magnetic leakage fields which are picked up by the record transducer head 62 when playing back the recording signals. In the recording arrangement shown, the cross-talk difficulties encountered in playing back magnetic records from adjacent narrow record traces of a magnetic record surface are overcome by using as a recording medium a magnetic material exhibiting a high coercive force of the order of 100 oersteds or more, and operating the recording medium at a low speed of the order of about 4 to 8 inches per second so that the signals of the lowest recorded frequency are recorded in the form of sufficiently short record signal waves as to reduce the spreading leakage field below a distribuing level in the manner disclosed and claimed in United States Letters Patent 2,535,480 issued to Semi J. Begun on December 26, 1950 on application Serial No. 612,728 filed August 27, 1945.

The magnetic recorder of the type disclosed herein is intended for recording speech, or in general for dictating purposes, and in such applications it is sufficient to keep the cross-talk level as high as 18 d. b. Since the cross-talk effect is greatest the lower the frequency of the record signals, and since signal frequencies of below 500 cycles are not required for intelligible reproduction of speech, the amplifier and the other elements of the recording system of the present invention are designed so as to substantially cut off frequencies below 500 cycles in carrying on recording operations.

Alternatively, carrier frequency recording may be utilized to keep the recorded magnet waves short enough in length to suppress cross-talk as disclosed and claimed in the co-pending Begun application Serial No. 742,793, filed April 21, 1947, as a continuation-in-part of application Serial No. 540,667, filed June 16, 1944, now Patent No. 2,419,195 granted April 22, 1947.

Figure 6:
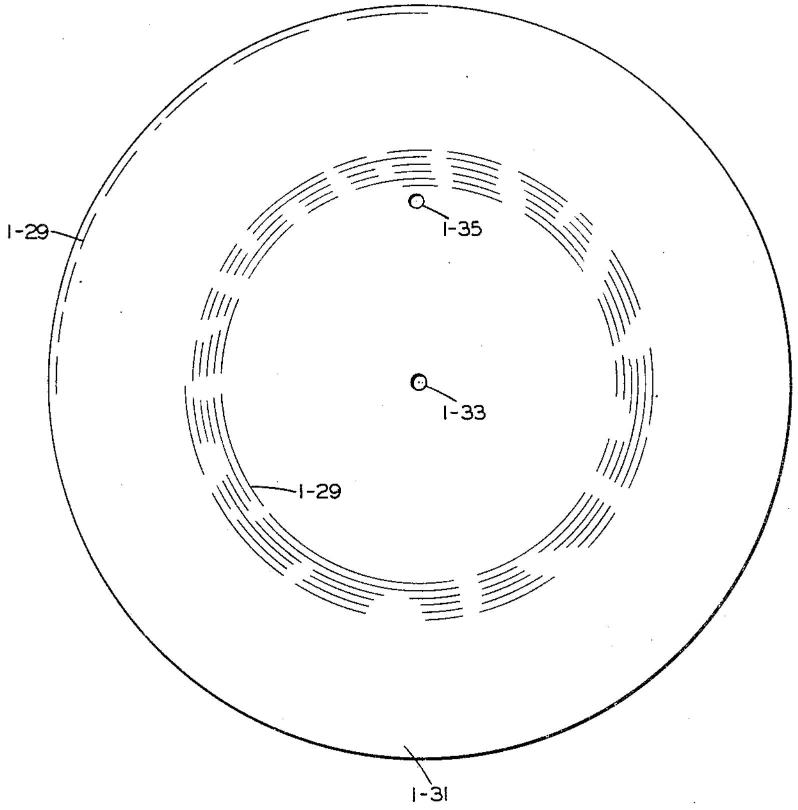
Fig. 6 is a plan view of a novel record member of the invention.

The record member 1–31 may be of any composition. It may, for example, be a thin sheet of paper with a permanently magnetizable coating applied to its surface and covering the area scanned by the transducing pole faces. As shown in Fig. 6, the dash lines 1—29 indicate the spiral track along which the transducing takes place. The central portion of the record member is covered by the guide disc and is not scanned but it is simpler to extend the magnetizable coating uniformly across the entire surface.

In one practical form the record member is a sheet of craft paper 9 inches in diameter and about 2 mils thick, the coating being a bonded stratum of permanently magnetizable iron oxide powder as described in the co-pending Kornei application Serial No. 685,092, filed July 20, 1946, and in the co-pending Foley application Serial No. 613,092, filed August 28, 1945, now abandoned. More than three minutes of recording can be made on the peripheral two-inch margin of one surface of such a record member with the record rotated at 20 revolutions per minute.

The paper record may be folded, creased, crumpled and even torn without destroying the recording which may be reproduced by smoothing the record member, mounting it on the turntable and operating the transducer with the switch set for playback. Any torn or severed portions of the record may be held in place as by an adhesive tape secured to the back surface of the record on both sides of the tear.

The record member may also be made of a relatively stiff material such as metal, brass for example, with a permanently magnetizable coating deposited on one surface. The electrolytic coating of mixed cobalt and nickel, as described and claimed in the co-pending Zapponi application Serial No. 738,973, filed April 2, 1947, also makes an excellent magnetic record stratum having a coercive force of 200 or more oersteds.

Other record materials, such as homogeneous permanently magnetizable metal, like stainless steel or non-magnetic media, having an interspersed powdered permanently magnetizable composition like the high coercive force iron alloys, may also be used.

The thickness of the record members has no effect on the transducing. Both surfaces of the record may be coated with the permanently magnetizable strata so that more of the available record surface is utilized, cross-talk between the two surfaces being prevented on the very thin sheets in the same manner indicated above in the co-pending Begun applications for the adjacent turns of a single surface.

Fig. 9 illustrates in a simplified diagrammatic manner the principal elements of another magnetic recording system in connection with which the principles of the invention will be described. A thin flexible circular record sheet member 31 which is held and supported on the upper surface of a turn table 32 which is held on a turntable shaft or spindle 33 which is journalled in a suitable bearing bracket 34 suitably secured to a supporting frame member 35, not shown.

The outer region of the circular sheet member 31 is provided with an exposed magnetic record surface 40 which may be formed, for instance, by a stratum of permanently magnetizable powder particles held dispersed in a bonding compound. The bonding compound with the permanently magnetizable particles dispersed therein may form only a thin coating united to the surface of a thin backing sheet of a material, such as strong paper, the total thickness of the sheet member with the coating secured thereto being only about .003 inch thick.

In another form, the record sheet member may be formed of a self-sustaining thin film of a bonding compound having uniformly dispersed therein magnetizable powder particles. Film-forming polymers of the vinyl type or of the polyamide type or of cellulose esters or ethers may be used for holding in dispersed form permanently magnetizable powder particles in sufficient quantity to form an effective magnetic recording medium the overall thickness of the film being of the order of only about .002 inch.

The radially inward surface region 50 of the upwardly facing exposed surface of the record sheet member 31 is provided with continuous spiral grooves so that a stylus 61 carried at the end of a guide or tone arm 60 will guide the forward end of the tone arm in radial direction across the magnetic record surface 40. The tone arm 60 carries not only the stylus 61, but also a magnetic record transducer head 62 arranged to magnetically record signals in the form of spiral record traces along the exposed magnetic record surface 40 of the recording medium when the turntable 32 and therewith the record sheet member 31 are rotated, thereby causing the stylus to advance the pole faces of the transducer head which rest on the magnetic record track surface in radial direction thereacross.

The magnetic transducer head 62, which may be of the type described in the Begun Patent 2,535,480, is indicated diagrammatically in Fig. 9 and structurally in Figs. 9A to 10A. The magnetic transducer head embodies a magnetic core structure formed of two thin flat pole pieces 2—11, and transducer windings 2—12, shown in the form of two coils, one coil surrounding one pole piece. The two pole pieces 2—11 are held longitudinally aligned in a plane on the opposite sides of an effective gap 2—13 bordered by pole faces 2—14 which are in contact engagement with the magnetic recording surface 40. The outwardly facing narrow edge surfaces 2—14 of the pole pieces 2—11, which border the gap 2—13 and form the pole faces, are convexly curved so that when a portion of the flexible record sheet surface 2—14 is placed against the pole faces, it is flexed into tangential engagement with the pole faces and assures positive and stable contact conditions between the pole faces and the magnetic elements of the record surface engaged thereby. As indicated in Figs. 9A and 9B, the two pole pieces 2—11 are held clamped in their aligned operative position by a mounting structure formed of two mounting members 2—15 which are secured to each other by a screw 2—16. The pole-face portions of the pole pieces 2—11 project outwardly from the mounting structure 2—15.

The magnetic record sheet 21 and the magnetic record transducer head 62 are so supported and guided relatively to each other that a portion of the magnetic record surface 40 engaging the convex longitudinally aligned pole faces 2—14 bordering the gap is flexed into stable contact engagement with the convex pole faces during the relative motion between the record sheet member 61 and the transducer head 62 for magnetically recording signals on narrow traces along the magnetic record surface 40 or for playing back the recorded signals.

It has been found in practice that the layer of felt or similar friction material affixed to the top of all common phonograph turntables, provides a cushion-like backing for the thin record sheet member 31 which assures such positive contact engagement between the exposed magnetic record surface 40 and the pole faces. However, if a thin record sheet member of the type described above is supported directly by a metallic surface of a supporting wall member, such as the turntable 32, the thin stratum of air, which is entrapped by the record sheet member 31 and the turntable surfaces, is effective in assuring such stable contact engagement between the convex pole faces 2—14 of such head 62 and the portion of the magnetic record surface 40 engaged thereby.

The magnetic recording system, indicated diagrammatically in Fig. 9, is arranged to carry on magnetic recording and reproducing operations under the control of a multi-blade recording switch 65, while the recording sheet member 31 is being rotated by the turntable 32. The recording switch 65 is shown in the neutral position and is arranged to establish recording circuits when it is actuated to the right, and playback circuits when it is actuated to the left.

When the recording control switch 65 is actuated to the right, its flexed contact blade 65—4 connects a source of high frequency oscillations, such as an oscillator 66, to a source of position power supply indicated by (+B). The oscillator circuit, as well as all other analogous circuits, described hereinafter are shown completed by the conventionally indicated ground connections, to which are also connected the negative terminals of all the D. C. supply circuits described hereinafter.

In the recording arrangement shown in Fig. 9, the high frequency oscillator 66 is utilized to supply only sufficient high frequency oscillating current to the windings 2—12 of the record transducer head during the recording process for providing therein a high frequency biasing flux component which is transposed on the signal recording flux during the recording process.

Although, in a recording system of the type described herein each element of the recording medium which is subjected to the recording flux may be first subjected to an erasing flux before it reaches the pole faces of the recording head, it is much simpler to provide for subjecting the entire extended magnetic record surface region 40 of the record sheet member 31, by passing it through an alternating current field which gradually decays after first saturating all magnetic elements of the recording medium passing through thereby in such a manner as to ensure that all elements of the recording medium have been restored to a magnetic neutral condition.

The signals which are to be recorded are shown supplied from a single source in the form of a microphone 67, which is actuated by the contact blade 65—2 of the recording switch in its right flexed position to the input side of amplifier 68, the output of which delivers the amplified signals which are to be recorded to the windings 2—12 of the record transducer head 62 through the contacts 65—1 of the recording switch in its right flexed position.

The oscillator 66 is shown connected to the output lead of the amplifier 68 through a coupling condenser 66—1, designed so as to mix the proper component of the high frequency oscillations produced by the oscillator 66 with the amplified signal current supplied by the microphone 67 in such manner as to produce in the gap region 2—13 of the magnetic head the desired combination of the signal recording flux and the superposed high frequency biasing flux component. In general, when recording speech frequency signals good results are obtained by using a high frequency biasing flux of about 20 to 30 kilocycles per second.

Referring to Fig. 9, and more specifically to Figs. 9A and 9B, which show the structural features of one form of recording mechanism exemplifying the invention, the turntable 32 has the usual depending flange, the inner side of which is arranged to be drivingly engaged by the friction tire forming the periphery of a floatingly mounted coupling pulley 3—11, which is driven by the shaft end 3—12 of the shaft 3—13 of a conventional vertically mounted turntable drive motor 3—14 which is secured by four rods to a mounting plate 3—15 suitably affixed to the casing structure 3—16 of the recording mechanism, the casing having a top wall 3—17 bordering the opening within which the turntable 32 rotates.

The coupling pulley 3—11 is rotatably mounted on a shaft post 3—18 which is affixed to a slider plate 3—19. The slider plate 3—19 is slidably mounted on the motor mounting plate 3—15, and is retained thereon by a spacer washer 3—21 held affixed to the mounting plate 3—15 by a screw 3—22. The spacer washer 3—21 extends through an opening in the slider plate 3—19 large enough to permit a floating sliding movement of the slider plate 3—19 with its friction pulley 3—11 relatively to the motor shaft 3—13 and the flange or rim of the turntable 32. The slider plate is also shown provided with a tongue extending through an additional hole 3—25 of the mounting plate 3—15 for properly guiding the slider plate 3—19 with its coupling pulley 3—11 along the surface of the motor mounting plate 3—15, so as to permit the coupling pulley 3—11 to be withdrawn from the full line position shown in Fig. 9B, in which it drives the rim of the turntable to the dash line position 3—11-A, in which it breaks the driving engagement with the rim 32—1 of turntable 32. The coupling pulley 3—11 is shown biased by a tension spring 3—27 connected between the slider plate 3—19 and the mounting plate 3—15 so as to bias the coupling pulley 3—11 into driving coupling engagement with the shaft end 3—12 and the turntable rim 32—1 for driving the turntable 32 at the proper relatively slow speed when the motor 3—14 is energized.

The motor 3—14 shown may be any conventional high speed motor used for turntable drives of the general type described above. In applications in which the conventional domestic alternating current power supply is available, a conventional high speed alternating current induction motor 3—14 is used. In applications in which only a direct current power supply is available, a conventional high speed governor-controlled D. C. motor may be used.

Depending on the relatively high speed of the drive motor 3—14, the diameter of the shaft end 3—12 and the diameter of the pulley 3—11 is so proportioned relatively to the diameter of the rim 32—1 of the turntable 32 that the peripheral region of the magnetic record surface member 31, on which a record is made, moves relatively to the pole faces of the magnetic record transducer head 63 at such average speed that the portions of the recording medium which move at the lowest speed have a speed of about four to five inches per second.

When the magnetic head 62 with the stylus member 61 rests on the magnetic recording surface 40 of the record sheet 31 and on the guide track 50, respectively, while guided by the pivotally mounted tone arm 60, the rotation of the turntable 32 may be instantaneously stopped by retracting the coupling pulley 3—11 from its coupling engagement with the rim 32—1 of the turntable—shown in full lines in Fig. 9B—to a retracted position shown in dash double-dot lines 3—11-A in Fig. 9B, in which the coupling pulley 3—11 remains coupled to the motor shaft end 3—12 and continues to rotate therewith. Furthermore, the turntable 32 so stopped may be instantaneously restarted and caused to move with the required speed by releasing the coupling pulley 3—11 from its retracted position 3—11-A to the full-line coupling position, without in any way subjecting the flexible rubber tire rim of the coupling pulley to excessive strain that might damage it.

Retraction of the coupling pulley is readily effected in an extremely simple manner, for instance, by connecting to its slider plate 3—19 one end of a pull member or link 3—28 which may be a thin cable or a rod, so that by pulling or releasing the link, the slider plate 3—19 with the coupling pulley 3—11 carried thereby, may be selectively retracted from or released into coupling engagement with the turntable rim for instantaneously stopping or restarting the rotation of the turntable and the recording medium.

If the pull link 3—28 is a cable it may be selectively operated by a rotary drum element 3—31 pivotally held, as by a pivot 3—32, on the frame structure of the recording device so that by turning the drum, as by a lever 3—33 connected thereto, in one direction or the other the link 3—28 which is connected to the drum will retract the coupling pulley 3—11 from or release it into its coupling engagement with the turntable rim 32—1.

If a recording device of the type shown in Figs. 9 to 9B is used for a dictating machine it is desirable to arrange the drive control arrangement just described so as to normally keep the turntable at standstill and cause it to be driven for performing a recording operation or for playing back a recorded message for transcription only when selectively actuated, as for instance, by a remote push button switch. One form of an arrangement for selectively controlling the drive coupling arrangement by remotely operated push button switch is indicated in Fig. 9. The operating lever 3—33 of the coupling control mechanism is arranged to be biased, as by a spring 3—34, to a position in which it actuates the link 3—28 to retract the coupling pulley 3—11 to the uncoupling position in which the turntable 32 remains at standstill. There is also provided a solenoid 3—35, the armature of which is connected to the operating lever 3—33 of the coupling control link 3—28 so that whenever the solenoid 3—35 is energized by the closure of a push button switch 3—36 the coupling control lever 3—33 is operated to release the coupling pulley 3—11 to the coupling position in which it transmits to the turntable the driving force which rotates at the speed required for recording or playing back a record recorded on the magnetic recording surface 40 on the record sheet number 31.

Fig. 9 also illustrates a simple back space mechanism arranged to be operated directly by hand or remotely through a push button operated electric control circuit which is arranged to back space the record transducer head 62 with the stylus 61 connected thereto a predetermined amount whenever it is operated. It is assumed that in the recorder arrangement shown in Figs. 9 and 9A the guide track of the guide surface 50 is of such character that when the turntable is rotating the record sheet member with the magnetic record surface 40 and the guide track surface 50 the engagement of the stylus 61 with the spiral guide tracks of the guide surface 50 will cause the tone arm 60 with the magnetic head 62 carried thereby to be advanced radially in outward direction, the outward border edge of the guide surface 50 being provided with an endless circular guide track so that when the stylus reaches the circular guide track the stylus with the magnetic head 62 to which it is connected will not be further advanced in a radially outward direction.

In the form shown, a back spacer arrangement comprises a pawl 71 pivotally mounted, as by a shoulder screw 71—2, held on a mounting bar 71—3 suitably secured to the side walls of the channel forming the tone arm 60. The mounting bar 71—3 is shown provided with a stop projection 71—4 limiting the clockwise rotation of the pawl 71 in which direction it is urged by the biasing action of a spring 71—5. The biasing spring 71—5 may be made of a wire, one end of which engages a hole in the pawl 71, the other end of which engages a hole in the mounting bar 71—3, and suitably arranged to hold the biasing spring in its operative position. The lower end of the pawl 71 which may be provided with more than one tooth is arranged to be engaged by the toothed ratchet edge 72—1 of a ratchet bar which is arranged to be actuated to move in a diagonally upward direction so that a motion imparted by it to the pawl 71 will cause it and the tone arm 60 to be moved in a back space direction. In particular, the ratchet bar 72 is arranged to be moved so that its ratchet edge 72—1 is advanced parallel to itself in a diagonally upward direction into contact engagement with the toothed end of the pawl 71 so that a slight further diagonally upward movement of the ratchet bar 72 causes the pawl 71 which is held against its stop, to lift the tone arm 60 with the transducer head and stylus carried thereby and move them in backward direction by a space corresponding to the amount of the diagonally upward stroke given to the ratchet bar 72.

The elements of the back spacer are so adjusted as for example by suitable selection of the bias action of spring 71—5, that when the ratchet bar 72 is retracted at the end of the back-spacing stroke the pawl 71 is moved backwardly but the arm 60 remains back-spaced. The withdrawal of the ratchet bar lowers the tone arm so that the guide stylus engages the guide groove and holds the arm 60 in back-spaced condition, following which the ratchet and pawl teeth separate permitting the pawl to spring back to its limit stop position against stop 71—4 and the apparatus is ready for another back-spacing operation.

As indicated diagrammatically in Fig. 9, such diagonal upward movement may be imparted to the ratchet bar 72 by pivotally interconnecting two spaced elements thereof to bars or links 72—2 pivotally held on pivot posts 73—1 mounted on a mounting member suitably affixed to the casing and frame structure of the recorder. A suitable biasing means, such as a tension spring, interconnected between one of the links 72—2 and a fixed element of the mounting member 73 keeps the ratchet bar 72 in a retracted position determined, for instance, by a stop projection 73—3 provided on the mounting member 73. The elements controlling the diagonal upward motion of the ratchet bar 72 are so designed and proportioned that its motion and upward direction is just sufficient to bring it to a level slightly higher than the level at which its ratchet edge 72—1 contacts the toothed end of the pawl 71 and is sufficient to cause it to slightly lift the tone arm as it advances it in backward direction in the course of the further movement of the ratchet bar 72 against the biasing forces of the biasing means 72—3 tending to return it to the normal position. Although the pawl 71 forming part of the tone arm structure 60 could be affixed thereto its pivotal mounting thereon assures that the return motion of the ratchet bar 72 following a back spacing movement will permit the pawl to ride along the teeth of the ratchet bar edge 72—1 of the ratchet bar 72 and permit the tone arm with the transducer head and stylus to drop into the back space position.

As indicated in Fig. 9, the ratchet bar 72 is provided with an operating arm 72—3 which may be arranged so as to be actuated either manually or remotely for imparting to the ratchet bar 72 a back space motion. The arm 72—3 is also provided with a stop projection 72—4 arranged to engage a stop member 74 suitably mounted, for instance, on the mounting member 73 of the ratchet bar 72, for limiting the back space stroke of the ratchet bar 72 and thus determine the amount of the back spacing effected by a back spacing operation.

In the form shown, the stop member 74 is threadedly mounted on a threaded shank of a screw 74—1 which is held in holes of lock projections 73—4, 73—5, formed by bending the portions of the mounting plate 73 out of its plane. The screw 74—1 is restrained against longitudinal movement by stop washers 74—2 affixed to the portions of the screw spindle 74—1 emerging from its supporting lugs 73—4, 73—5. The stop member 74 is provided with a flat surface facing an adjacent surface of the mounting member 73 for preventing the stop member 74 from rotating, and causing it to be advanced in one or the other direction when the screw spindle 74—1 is rotated by an operating wheel 74—5 attached to its end so that a peripheral portion of the wheel 74—5 projecting through a slot in the top wall 3—17 of the recording device may be turned in one direction or the other for adjusting the position of the stop member 74. The periphery of the operating wheel 74—5 of the stop member 74 may be provided with marks corresponding to different desired spacing distances, for instance, one groove, two groove, etc, spacing distances so that the user may select the desired back spacing distance.

In order to provide remote operation of the back-spacing mechanism, the mounting member 73 has shown mounted thereon a relay 76 provided with an armature having an operating finger 76—1 which imparts to the ratchet bar 72 a back-space motion each time the coil of the relay 76 is energized. The operation of the relay 76 is controlled by a remotely positioned push button switch 76—6 which is arranged to energize the back-space relay 76 in the obvious way shown whenever the switch 76—6 is operated.

As indicated in Fig. 9, the guide track structure 50 with the spiral guide track grooves formed thereon may form an integral part of the record sheet member 31 provided with the extended magnetic record track surface along which signals are magnetically recorded along spiral record traces. When the guide track surface 50 forms an integral part of the record sheet member 31, the guide track grooves 51 may be formed by applying to the surface of the record sheet member 31 provided with the guide grooves a layer of a bonding compound, such as a plastic compound, which is solid at normal temperature and molding therein a spiral guide groove configuration in a manner similar to that employed in molding standard grooved phonograph disc records. The groove molding operation may be carried on at the same time as the operation of applying the plastic compound to the surface portion of the record sheet member 31 provided with the guide track grooves 51.

In the particular form of recording device shown in Figs. 9 to 12, the spiral magnetic record traces are recorded while the magnetic record head 62 is advanced by the guide arm 60 from the outer border region of the guide track surface 50 toward the outer periphery of the recording sheet member 31. Accordingly, the guide track surface 50 is provided with a corresponding spiral groove so that when the turntable 32 is rotated, the spiral guide groove 51 will impel the stylus and therewith the guide arm 60 from the innermost guide groove of the guide track to the outermost guide groove of the guide track 50, the outermost guide groove being made in the form of an endless circular groove so that when the stylus reaches it, the stylus as well as the tone arm will not be advanced farther in radially outward direction.

In the recording system shown, the exposed magnetic record surface 30 of the record member 31 is perfectly smooth and the adjacent convolutions of the magnetic record traces, along which signals are magnetically recorded by the pole faces of the magnetic head or played back therefrom, are physically intangible. However, their location is fixed by the fact that the magnetic record sheet member 31 with its exposed magnetic record surface 30 is physically united along at least two predetermined aligning portions thereof to the guide track surface with its guide grooves which fix the location of the magnetic record traces along the magnetic record surface 30 while recording magnetic signals along the physically intangible spiral magnetic record traces or when playing back the recorded signals from the spiral magnetic record traces.

According to one phase of the invention, the guide track structure of a recording mechanism of the type described above is made in the form of a separate unit distinct from the record sheet member and they are arranged to be combined into a composite magnetic record surface member and guide structure only when it is desired to make a new record or to play back a record from the spiral magnetic record traces of the magnetic record sheet member.

In Figs. 9A to 11 is shown one form of a simple practical magnetic recording device in which a record sheet member is combined with a separable guide structure member for making new records or playing back previously made records from the intangible spiral record traces of the magnetic record member in the form of an extremely thin foldable paper-like sheet member which may be folded and mailed before or after performing a recording operation or playing back a record previously recorded thereon.

In Figs. 11 and 11–A is shown the record sheet member 31 removed from the turntable 32. The record sheet member 31 is made of thin paper coated on the upwardly facing surface with magnetic powder particles suspended in a bonding medium which forms with the powder particles an exposed magnetic record layer 30 on which the magnetic records are made. In the practical manufacture of such record sheet member, a wide web of paper is coated on one side with a thin magnetic powder layer, and circular record blanks, such as shown in Fig. 11, are then cut out from the web.

In the practical forms of the recorder shown in Figs. 1 to 10, the turntable is of standard form designed to accommodate record blanks nine inches in diameter, and the record sheet member has a diameter of nine inches. In the record sheet members shown, only the outer peripheral region of the record member, two inches in radial width, is used for recording magnetic signals along spiral record trace convolutions. The inner portion of the record sheet member bounded by the line 4—11 is designed for cooperation with the disc-like guide member 4—21 which is placed over the central region of the record blank 31 in the manner indicated in Figs. 1, 2, 9A and 9B. In order to properly align and fix the relationship of the magnetic record surface 30 with the guide surface of the guide member 4—21, the record sheet member 31 of Figs. 9A and 9B is provided with two aligning openings 4—12, 4—14 similar to those shown in Fig. 6, for cooperative alignment with corresponding aligning elements shown in the form of aligning openings 4—22 and an aligning depression 4—24 provided on the side of the guide disc member 4—21 facing the central region 4—11 of the record sheet member 31.

When used with a turntable mechanism of the type shown in Figs. 9A and 9B, the aligning openings and depressions of the record sheet member 31 and the guide disc 4—21 are designed for cooperation with the central spindle or shaft 33 of the turntable and an additional aligning projection 3—41 projecting outwardly above the exposed surface of the turntable so that they enter into the openings 4—12, 4—14 of the record sheet member and the openings 4—22, 4—24 of the guide disc member when they are placed in their properly aligned position one above the other on the turntable. Both the record sheet member 31 and the guide disc member 4—21 are arranged to be individually placed in their aligned position on the spindle and aligning projections 33 and 3—41 of the turntable so that they lie flat one above the other on the exposed surface of the turntable 32 with their aligning openings engaging the aligning spindle 31 and aligning projections 3—41 of the turntable.

The guide disc member 4—21 is provided in the region of its central opening 4—22 with an upwardly projecting grip portion 4—26 so that it may be readily gripped for removing it from and placing it in its aligned position on the turntable.

The thickness of the magnetic record sheet member with the magnetic coating layer formed thereon is only about three mils or less and its central portion in which the aligning opening 4—12 is formed is reinforced by an additional reinforcing sheet element 4—15, for instance, kraft paper about ten mils thick, so as to form a grommet-like reinforcement bordering the region of the central aligning opening 4—12 of the record sheet member. The reinforcing element 4—15 may be made in the form of a grommet structure having a diameter of only about twice the diameter of the aligning opening 4—12 of the sheet member 31.

Alternatively, as shown in Figs. 11 and 11–A, the reinforcing member 4—15 may extend over the entire central area of the record sheet member 31 along which it is coupled with the disc-like guide member 4—21 in the manner indicated in Figs. 9A and 9B. If the reinforcing sheet member 4—15 is made of a diameter equal to the diameter of the guide disc member 4—21, the additional aligning opening 4—14 of the sheet member extends also through the portion of the reinforcing sheet member 4—15 overlying it, in the manner indicated in Fig. 11–A.

To facilitate removal of the flexible sheet member from its engagement with the aligning projections 33 and 3—41 of the turntable, the central aligning opening 4—12 is provided with a plurality of radial slits 4—13 and the additional aligning opening 4—14 is provided with a similar slit 4—16 extending transversely therefrom so that the border portion of the sheet member adjoining the opening 4—12, 4—16 may slightly flex when the record sheet member 31 is removed from the aligning pins or placed thereon, without, however, in any way affecting the centering and proper alignment of the record sheet member 31 when it is placed on the aligning projections 33, 3—41 of the record sheet member, and thereafter retained in flattened condition thereon by the superposed guide disc member 4—21.

The upwardly facing surface of the guide disc member 4—21 is provided with a guide groove region 4—27 extending over a radial depth equal to the radial depth over which the pole faces of the magnetic record transducer head 32 cooperate with the exposed magnetic record surface 30 of the record sheet member for recording or playing back magnetic signals along magnetic record traces thereof. In the particular form of recording arrangement shown, utilizing a record sheet member nine inches in diameter, magnetic records are made on the region of the record member 31 extending radially two inches from its outer periphery, and the circular guide surface of the guide member 4—21 is provided with guide grooves on a region 4—27 extending radially two inches from its outer periphery.

The guide member 4—21 with its exposed grooved guide surface region 4—27 may be made either of a metal, for instance, cast or machined, or in the form of a plastic molded member which is molded in one process with the guide grooves formed on its exposed guide surface region 4—27. In a commercial form of recorder, of the type shown in Figs. 9A and 9B, the guide surface member 4—21 is made out of a transparent molded plastic material, and its cost is so low that it may be readily replaced after the guide grooves become worn because of extended use.

The guide arm 60 for the magnetic head 62 and the stylus 61 is made in the form of a downwardly opening channel member, the rear portion of which is connected through a pivot junction 4—31 to a pivot seat portion 4—32 formed on the lying portion of the top wall 4—17. As shown in Fig. 12, the pivot structure 4—13 is provided with a spherically shaped seating surface engaging a conically shaped seating surface of the seating portion 4—32 of the top wall 3—17. The pivot junction member 4—31 is shown provided with a hollow tubular extension 4—34 extending through a hole in the conical seating portion 4—32 of the supporting wall 3—17. The pivotal connection between the pivot structure 4—31 of the tone arm in the pivot seat portion 4—32 of the supporting wall 3—17 is completed by two retaining washers 4—35, 4—36 and a coil compression spring 4—37 encircling the tubular pivot extension 4—34 projecting through the hole in the pivot seat 4—32, and retaining thereon by a cotter pin 4—38 so that the pivotal end of the guide arm 60 is pivotally joined to the pivot seat in such manner that the arm is free to adjust its pivotal connection to its pivot seat in a manner corresponding to a universal-joint connection, and permitting the arm to be lifted as well as turned and swivelled in a horizontal direction from a position in which its forward end faces the upper side of the turntable to a standby position in which it faces a portion of the top wall 3—17 of the mechanism bordering the turntable in which it may be retained by a retaining structure of the type shown in Figs. 12-A and 12-B.

Referring to Figs. 12-A and 12-B, the retaining structure generally designated 4—41 is formed of a strip, of metal, for instance, one or both ends of which are suitably affixed to the top wall 3—17 of the mechanism, the strip 4—41 being bent to provide a stop projection 4—42 adjoined by an upwardly facing U-shaped retainer section 4—43 one side of which merges in a downwardly sloping guide region 4—44 shaped so that when the forward end of the guide arm 60 is turned outwardly away from the turntable its outer side wall will automatically engage the sloping guide region 4—44 of the retainer structure 4—41, and guide it therealong until it drops into the U shaped retainer region 4—43 of the retainer structure, the stop projection 4—42 stopping further outward movement of the guide arm.

In order to retain the outer side wall of the guide arm 60 in the retainer section 4—43 of the retainer structure, a side wall portion of the retainer section has formed thereon, as by punching, a resilient prong member 4—45 which operates as a resilient clamp which holds the tone arm releasably clamped in the retainer section 4—43 of the retainer structure. This arrangement makes it possible to automatically lock the guide arm 60 with the elements carried thereby in a standby position, thereby assuring that the guide arm doesn't become loosened when the recorder is carried from one place to another or while it is being shipped.

The magnetic head 62 and the stylus 61 are carried in the forward portion of the guide or tone arm 60 in the manner indicated in Figs. 9-A to 10-A. As explained above, the two pole pieces 2—11 of the magnetic head are held clamped in their operative position between two mounting members 2—15, 2—16 which are affixed to each other by a screw 2—17, the threaded shank of which engages a threaded opening formed in the mounting member 2—16, which may be made of metal, and the pole piece portions provided with the pole faces 2—14 which engage the surface of the magnetic recording medium project beyond the boundary wall of the two mounting members 2—15, 2—16. Furthermore, as explained in the above identified patent of S. J. Begun, and in the application of Otto Kornei, Serial No. 635,045, filed December 14, 1945 abandoned after being refiled as application Serial No. 723,541, now issued as United States Letters Patent 2,513,653, the magnetic core structure formed by the two pole pieces 2—11 and a coil winding 2—12 on each pole piece has two alike gaps and two alike sets of pole piece tips bordering the gap, and arranged in such manner that extraneous disturbing noise producing fluxes are balanced out and neutralized.

However, since the recording mechanism of the present invention is designed for operation with a cheap electrical motor having extremely strong disturbing leakage fluxes, the magnetic head as shown is provided with an additional shielding structure for further reducing the effect of extraneous disturbing magnetic fluxes. The magnetic shield structure of the magnetic head, shown in Figs. 9-A to 10-A, is formed of two cup-like magnetic shield members 2—21 slipped over the two mounting members 2—15, 2—16 so as to form a shielded casing enclosing the windings and all of the pole piece structure of the magnetic head except for the two pole tip regions provided with the pole faces 2—14 and projecting downwardly into engagement with the exposed magnetic recording surface 30 of the record sheet member 31. The side wall portions of the two shield members 2—21 extending along the side of the magnetic head provided with the outwardly projecting pole face portions 2—14 have edge portions spaced from the pole pieces by a gap sufficient to prevent the magnetic material of the shield members 2—21 to form a magnetic short circuit for the record signal flux interlinking the windings of the transducer head and the magnetic elements of the recording medium. The two shield members 2—21 may be each formed of a sheet member of magnetic material. Alternatively, each shield member 2—21 may be formed of a composite multi-layer or multi-lamination sheet structure, one layer being formed of a highly permeable magnetic material, and a layer or lamination of electrically highly conducting material, such as copper or silver.

The two cup-shaped shield members 2—21 are provided with holes through which the screws 2—17 of the mounting structure may pass. The shank of the clamping screw 2—17 of the magnetic head 62 projects outwardly beyond the mounting member 2—16 and extends through a hole in one arm of a bracket member 2—25, through which the magnetic head is affixed to the forward end of the guide arm 60, the shank of the screw 2—17 being secured to the arm of the U shaped bracket member 2—25 by a nut mounted on the threaded end of the screw 2—17 projecting through the hole in the arm of the bracket 2—25. The two shield members 2—21 are placed over the magnetic head, one of the shield members 2—21 is held affixed to the mounting member 2—15 of the magnetic head by the head of the clamping screw 2—17, and the other shield member 2—21 is held in its operative position because it is clamped between the mounting member 2—16 and the arm of the bracket 2—25 to which the magnetic head is affixed.

The bracket member 2—25 is suitably secured to the forward portion of the guide arm 60 as by a screw clamping the intermediate portion of the bracket member to the underside of the upper wall of the guide arm. The guide stylus 61 is connected to the magnetic head structure 62 through an arm 2—27, a threaded end of which is held affixed in a hole of the other of the bracket member 2—25 by two screws 2—28. The free end of the arm 2—27 is provided with a perforation for receiving the shank of the stylus 61 which may be held affixed therein by a screw 2—29 seated in a threaded hole extending axially from the free end of the arm 2—27 toward the transverse stylus perforation thereof.

The spacing between the stylus and the pole face tips 2—14 of the magnetic head may be adjusted in any of a variety of manners, for instance, by loosening the two screws 2—28 which hold the stylus arm 2—27 clamped to the supporting bracket 2—25 of the magnetic head so that by shifting the connection of the stylus arm 2—27 to the bracket, the distance may be adjusted. Additional adjusting means may be obtained by seating the head of a screw against the borders of a hole formed in one arm of the mounting bracket 2—25 of the transducer head, the threaded shank of the screw extending through the hole and engaging a threaded hole in the other arm of the bracket so that by first turning the screw for first resiliently bringing the two arms towards each other, adjustable rotation of the screw in one or the other direction will permit adjustment of the spacing of the tip of the stylus relatively to the pole face tips of the magnetic head.

A guide arm structure 60 of the type described above, when placed so that the pole face tips of the magnetic head 62 and the stylus 61 rest on the magnetic record sheet member 31 and the guide surface region of the guide member 4—21, will always be held in proper guiding position because the pole piece structure of the magnetic head 62, the stylus 61 and the pivotal connection of the tone arm with its supporting wall 3—17 of the recording apparatus form a three-legged support which keeps all the substantially rigidly interconnected elements of the guide arm in a positive stable equilibrium position, while the pole tip region 2—14 of the magnetic head in the forward part of the arm is guided by the guide tracks of the guide member in radial direction across the moving rotating exposed magnetic record surface of the recording sheet member 31.

Provision is made to assure that the stylus is subjected to biasing forces which maintain it at all times in guiding engagement with the guide grooves of the guide groove region 4—27 of the guide member 4—21, while the stylus imparts to the pole tip region of the magnetic head a radial motion relatively to rotating surface of the record sheet member 31; and to assure that the forces with which the pole faces are pressed against the exposed moving magnetic surface layer of the record sheet member 31 are not excessive.

In practice, it has been found that the forces with which the pole faces are pressed against the exposed surface of the magnetic record sheet member 50 should not be excessive because otherwise the pole faces are subjected to an excessive wearing action. Satisfactory pole face wear conditions are obtained if the forces exerted by the pole faces on the exposed magnetic surface of the record sheet member 31 are about five to six ounces. The forces with which the stylus 61 is held within the guide grooves of the guide groove region 4—27 of the guide disc should be about twice as large. The proper distribution of the forces may be secured by arranging the elements carried within the tone arm in such manner that the center of gravity of the gravitational forces acting on the forward part of the arm apply the proper larger forces to the stylus while keeping the force applied to the pole faces within the required low limits of about five to six ounces.

In order to assure that the forces with which the pole faces 2—14 of the magnetic head are held pressed against the moving magnetic record surface of the record sheet member 31 do not exceed the desired magnitude, the magnetic head 62 may be provided with an additional guide arm 2—18 having a finger portion 2—19 engaging the exposed surface of the record sheet member 31 so as to limit the forces acting between the pole faces 2—14 of the magnetic head and the record sheet member. The guide arm 2—18 may be formed of a strip of spring metal and its finger portion 2—19 is curved in all directions so that only a relatively large area portion of a smooth curved surface thereof comes into engagement with the exposed magnetic record surface of the sheet member 31 and thus keeps to a minimum the specific pressure along this contact region.

In Figs. 13 to 14 is shown a modified form of a magnetic recording device exemplifying the invention. In particular, the turntable mechanism of the magnetic recording device of Figs. 13 to 14 is arranged to be operated as a magnetic recording and playback device in essentially the same manner as the device described in connection with Figs. 9 to 12–A while the turntable is rotated at a low speed, the turntable mechanism being arranged also so as to make it possible to rotate the turntable at the speed required for playing back standard disc type phonograph records with the standard phonograph pick-up.

Referring to Figs. 13 to 14, the turntable 32 forming part of a turntable mechanism is provided with a revolvably mounted turntable 32 designed to be driven at two speeds by a motor 3—14 suitably secured to the underside of a mounting plate 3—15, as in the mechanism of Figs. 9 to 12–A. The motor shaft is provided with a shaft end 3—12 of reduced diameter designed for cooperation with a floating coupling pulley 3—11 for driving the turntable 32 in clockwise direction at a low speed during magnetic recording and playback operations. The adjoining shaft portion 3—13 of the motor is of a larger diameter and is arranged for cooperation with another floatingly mounted coupling pulley 4—51 for coupling the drive shaft portion 3—13 to the turntable rim 32—1, and driving the turntable 32 in the same clockwise direction at the normal speed required for playing back standard phonograph discs, such as at seventy-eight revolutions per minute; the top wall 3—17 of the turntable mechanism, shown in Fig. 14, having pivotally mounted thereon a tone arm 60–A provided with a standard phonograph pickup for playing back grooved records of a standard phonograph type.

In the turntable mechanism of Figs. 13, 13–A, the two floating coupling pulleys 3—11, 4—51 are slidably supported by another standard form of slider mechanism. The coupling pulley 3—11 is rotatably mounted on a shaft post which is affixed to a slider plate 4—53 having two flat slider bar extensions 4—54 slidably guided in guide grooves 4—55 of a jib or guide block 4—56, which is pivotally mounted in a proper operative position on one end of a shaft post 4—57 held suitably affixed by a spacer collar structure 4—58 to the mounting plate 3—15. The other coupling pulley 4—51 is rotatably mounted on a similar shaft post held affixed to a slider plate 4—63 having slider extensions 4—64 slidably guided in guide grooves of another guide block 4—56, pivotally mounted on a downwardly projecting end of shaft post 4—57.

Since the slider mechanism for the floating coupling pulley of a phonograph mechanism of the type shown in Figs. 13 and 13–A is well-known and used in conventional phonograph turntable mechanisms no further description thereof is given.

Means are also provided for selectively retracting one or the other of the coupling retracting pulleys 3—11, 4—51 from its coupling position. One form of such selective retracting mechanism is shown diagramatically in Fig. 13–A. A control lever 4—66 pivotally mounted at 4—67 is movable from the full-line position shown, in which it is held against a stop pin 4—68, to the opposite position in which it is retained by a stop pin 4—69. An intermediate part of the arm 4—66 is connected through two links shown in the form of cables 4—71 to the two slider plates 4—53, 4—63 of the two coupling pulleys 3—11, 4—51, respectively, so that when the lever 4—66 is brought against stop 4—68 coupling pulley 4—51 is retracted from its coupling position, while coupling pulley 3—11 maintains a driving coupling connection between the shaft end 3—12 and the turntable rim 32—1 for driving the turntable at the low speed required for carrying on a magnetic recording or play-back process in the manner described above. By tilting the coupling control lever 4—66 against the stop pin 4—69, the coupling connections are reversed and the coupling pulley 3—11 being retracted from its coupling position, and couplnig pulley 4—51 establishing a driving connection between the shaft section 3—13 of larger diameter, and the turntable rim 32—1 for driving the turntable at the higher speed required for playing back a record recorded on a standard grooved disc placed on the top of the turntable 32.

As indicated in Fig. 13–A, the slider plate 4—53 of the coupling pulley 3—11, which drives the turntable while carrying on magnetic recording or playback operations, is also shown connected by an additional link 3—28 to a selectively operable drive stop mechanism for selectively starting and stopping the turntable while carrying on a magnetic recording or playback operation in the manner described in Fig. 9.

With the mechanism of the type shown it is merely necessary to actuate the coupling control lever 4—66 against the stop 4—68 when it is desired to carry on magnetic recording operations, or to actuate the coupling lever 4—66 against the stop 4—69 if it is desired to play back records from a standard grooved phonograph disc.

In Figs. 15 to 16 is shown another arrangement for selectively driving the turntable 32 either at a low speed for carrying on a magnetic recording of a playback operation, or at a higher speed for playing back a record from a standard phonograph disc.

The turntable drive mechanism of Fig. 15 is formed of the same essential elements as the turntable mechanism shown in Figs. 9A and 9B. However, the motor shaft 3—13 does not have a shaft end of reduced diameter so that when the coupling pulley 3—11 is biased by the biasing spring 3—27 to maintain coupling engagement between the shaft 3—13 and the turntable rim 32—1, the turntable will be rotated clockwise at the standard speed, such as seventy-eight R. P. M. required for playing back a record from a standard grooved phonograph disc. As indicated in Fig. 16, the top wall 3—17 of the recording apparatus is provided with a pivotally mounted tone arm 60—B carrying at its front end a standard phonograph pick-up for playing back standard records placed on the turntable 32, and driven at a standard speed such as seventy-eight R. P. M.

The drive mechanism of Figs. 15, 15–A has an additional slider plate 4—73 provided with a guide arrangement similar to that of the upper slider plate 3—19 for slidably guiding the slider plate 4—73 along the underside of the mounting plate 3—15. The slider plate 4—73 has revolvably mounted thereon, in a suitable bearing 4—75 affixed thereto, an upwardly projecting shaft post 4—76 to the lower end of which is affixed a rubber-tired pulley 4—77. There is also shown provided a biasing spring 4—78 connected between the additional slider plate 4—73 and a fixed point, such as a portion of the mounting plate 3—15, for urging the slider plate 4—73 to a position in which the shaft post 4—76 with its pulley 4—77, carried by the slider plate 4—73, are held in a retracted position in which they are shown in Fig. 15–A, in which the shaft 4—76 and its pulley 4—77 are free from coupling engagement with the rubber-tired coupling pulley 3—11 and the motor shaft 3—13. The slider plate 4—73 has also connected thereto a link, such as a cable 4—79, arranged so that by pulling it against the action of the biasing spring 4—78 the shaft 4—76 with its pulley 4—77 are brought to a position in which the shaft 4—76, after first coming into engagement with the periphery of the coupling pulley 3—11, moves it out of its coupling engagement with the motor shaft 3—13, the further motion imparted by the link 4—79 to the slider plate 4—73 bringing the pulley 4—77 into coupling engagement with the motor shaft 3—13 thereby establishing a driving connection from the motor shaft 3—13 by way of the pulley 4—77 and the shaft 4—76 carried by the additional slider plate 4—73 to the coupling pulley 3—11 which is urged by its biasing spring 3—27 into coupling engagement with the turntable rim 32—1 as well as the shaft post 4—76. The pulley 4—77 and shaft 4—76 interpose thus a speed reducing coupling link between the motor drive shaft 3—13 and the coupling pulley 3—11, and cause the turntable to be driven in counter-clockwise direction at reduced speed at which the turntable mechanism may be used for carrying on magnetic recording and play-back operations in the manner analogous to that described in connection with Figs. 9 to 12–A. However, since the turntable now rotates at a low speed in counter-clockwise direction, the additional guide arm for the magnetic head and the stylus has to be mounted in a correspondingly modified position, indicated in Fig. 16, by the guide arm 60–C carrying at its front end the magnetic head and the stylus in the manner analogous to the guide arm 60 of Figs. 9 to 12–A.

The selective actuation of the additional slider member 4—73 to the two different positions in which it interposes and removes respectively the speed reducing and drive reversing link between the motor shaft 3—13 and the turntable rim 32—1 may be controlled by a lever, such as lever 4—66 described in Fig. 14, connected to the free end of link 4—79 so that by moving the lever to one position the speed reducing link is interposed, and by moving it to the other position the speed reducing link is interposed in, and removed from, respectively, the coupling connection between the motor shaft and the coupling pulley 3—11. With such arrangement, the recording mechanism of Figs. 15 to 16 may be utilized to carry on magnetic recording and playback operations at the required reduced speed while the speed reducing link is interposed in the drive connection between the motor shaft and the turntable, and the magnetic recording or playback operation may be selectively stopped or started in the same manner as described in connection with Figs. 9 to 12-A by means of a link, such as link 3—28 connected to the slider plate 3—19 of the pulley 3—11.

Figs. 17 to 17-B show a modified form of a turntable mechanism forming part of a magnetic recording device based on the principles of the invention. A turntable 5—11 seated on a revolvably mounted spindle 5—12 forms part of a turntable mechanism of the type described in connection with Figs. 9 to 12-A, except that the turntable spindle 5—12 projects to a higher level above the turntable 5—11. The turntable 5—11 is also provided with an upwardly projecting aligning post 5—13, and serving to align with the turntable a guide disc 5—14 a spacer collar 5—15 which may be a distinct element or form part of a second turntable 5—16 placed over the spindle 5—12 and the aligning post 5—13 so that they all rotate with the turntable 5—11. On the upper turntable 5—16 is placed a magnetic record sheet member 31 having at its upwardly facing side an exposed magnetic record layer, as in the arrangement of Figs. 9 to 12-A, the record sheet member 31 being aligned with the guide disc 5—14 by their aligning openings engaging the spindle 5—12 and the aligning post 5—13. The guide disc 5—14 of the recording mechanism, shown in Figs. 17 to 17-B, is provided with a guide groove region 5—20, having spiral guide grooves or tracks for guiding the stylus 61 carried by the end of a guide arm 5—21 pivotally connected through a pivot pin 5—22 to a vertical pivot shaft 5—23 supported by a fixed horizontally mounted frame member 5—25, rotatably mounted in a collar 5—25 held affixed to a fixed horizontal frame member 5—26 which may form the top wall of the device.

The portion of the pivot shaft 5—23 to which the guide arm 5—21 is connected by a pivot pin 5—22 has seated thereon a collar member 5—27 provided at its bottom with a circular flange seated on the upwardly facing rim of the supporting collar 5—25, the collar 5—27 having flat sides for guidingly engaging the inwardly facing sides of the channel-shaped guide arm 5—21 as it pivots on the pivot pin 5—22 extending through openings in the collar 5—27 and in the hollow shaft 5—23. The upward end of the hollow pivot shaft 5—23 and the mounting collar 5—27 seated thereon have connected thereto by an additional pivot pin 5—31 a guide arm 60 carrying on its front end a magnetic head 62 having pole pieces provided with pole tip faces 2—14 engaging the upwardly facing magnetic record layer of the magnetic record sheet member 31 held in its aligned position by the upper turntable 5—16 for recording or playing back magnetic records recorded on spiral convolutions of the exposed magnetic record surface while the guide arm 60 of the magnetic head is advanced in radial direction by the guiding action of the guide stylus 61 engaging the guide grooves of the guide groove region 5—20 formed in the guide disc 5—14 held in aligned position by the lower turntable 5—11. The inwardly facing sides of the channel-shaped guide arm 60 are guidingly engaged by the flat sides of the collar 4—27 in the same manner as the side walls of the stylus guide arm 5—21, and, as a result, the lateral movement imparted to the stylus guide arm by the operation of the guide disc 5—20 will also be imparted to the guide arm 60 of the magnetic head 62.

A link member shown in the form of a strip 5—32 has a pivotal connection with the side wall of the guide arm 60 of the magnetic head and a similar pivotal connection with the stylus guide arm 5—21 so that when the guide arm 60 of the magnetic head is raised, the stylus guide arm 5—21 will likewise be raised whenever it is desired to slightly raise the guide arm 60 for swinging it away from the position in which the magnetic head overlies the turntable 5—16 and the record sheet member 31 held thereon. One of the pivotal connections of the link to one of the two arms 60 and 5—21 has a clearance to provide in the connection a certain amount of lost motion in order to assure that whenever the magnetic head is released with the guide arm 60 into engagement with the record member 31, the stylus 61 of the guide arm 5—21 will establish guiding engagement with an underlying groove of the grooved guide region 5—20 thereof.

The flat guide disc 5—20 may be made by molding from a plastic material in a manner analogous to that described in connection with the guide disc 4—21 of Figs. 9-A and 9-B. Should the guide disc 5—14 of the recording mechanism shown in Figs. 17 to 17-B be worn out, it may be readily replaced after first removing the upper turntable 5—16 with the spacing collar 5—15 from their position on the turntable spindle 5—12 and aligning post 5—13 in which they are shown in Figs. 17 to 17-B. The worn out guide disc 5—14 is then lifted and replaced by another one whereupon the upper turntable 5—16 in returned to the position shown.

In order to retain the thin magnetic record sheet member 31 in generally flat condition on the turntable, there is provided a retaining member 5—33 having a hole fitting over the spindle 5—12 and provided with a downwardly facing surface resting on and holding down the central region of the thin circular record sheet member 31.

The recording mechanism of Figs. 17 to 17-B will operate in essentially the same manner as the recording mechanism of Figs. 9 to 12-A and it may be provided with all its operating features previously described.

In Figs. 18 and 18-A is shown another form of recording mechanism of the general type described above in connection with Figs. 17 to 17-B. A turntable 32 is seated on a rotatably mounted spindle 33 forming part of a turntable drive mechanism generally similar to that described in connection with Figs. 9 to 12-A. The underside of the turntable 32 shown in Fig. 18 has secured thereto, as by screws, not shown, a disc-like guide ring 5—44 having a downwardly facing exposed guide region 5—45 provided with spiral guide grooves similar in character to those of the guide groove regions of the guide disc 4—21 and 5—14 shown in Figs. 9 to 12-A and 17 to 17-B, respectively.

The turntable is provided with an aligning projection 5—47 which, in conjunction with the upwardly projecting spindle 33, serves to align the exposed magnetic record surface of a record sheet member 1—31 with the guide groove region 5—45 of the guide ring 5—44 in a manner analogous to the corresponding elements of the recording devices shown in Figs. 9 to 12-A and 17 to 17-B. In order to assure proper alignment of the guide ring disc 5—44 when it is affixed to the underside of the turntable 32, it may be provided with a suitable aligning element, such as a depression, designed for cooperation with an aligning projection provided on the underside of the turntable so that the guide disc 5—44 can be secured to the turntable only in a predetermined aligned position correlated to the location of the upwardly extending aligning projection 5—47 thereof.

A magnetic head 62 is carried on the front end of a guide arm 60 for cooperation with the magnetic recording surface of the recording medium 1—31 in the same manner as described in connection with Figs. 9 to 12-B. The guide arm 60 is pivotally connected through a pivot pin 5—48 to the upper end of a hollow pivot shaft 5—51 rotatably mounted in a mounting collar 5—52 suitably affixed to the generally horizontally extending top wall 5—53 of the turntable mechanism. In order to provide a proper guiding connection between the guide arm 60 and the pivot shaft 5—51, the upper portion of the pivot shaft 5—51 has seated thereon a guide collar 5—54 having flat sides guidingly engaging the inwardly facing flat side wall surfaces of the channel-shaped guide arm 60, the pivot pin 5—48 holding the guide collar 5—54 fixed to the pivot shaft 5—51.

The guide grooves of the guide disc 5—44 are designed to guidingly engage the stylus 61 carried at the front end of a guide arm 5—56 pivotally connected through a pivot pin 5—57 to a portion of the hollow pivot shaft 5—51 having seated thereon a guide collar 5—58 provided with flat sides for guidingly engaging the flat sides of the channel-shaped guide arm 5—56 connected thereto. As in the device of Figs. 17 to 17-B, the pivot shaft 5—51 is retained in its position within the mounting collar 5—52 by a coiled compression spring 5—59 seated between two washers 5—61, 5—62 and held on the shaft by a cotter pin 5—63 extending through a hole in the portion of the shaft projecting beyond the washer 5—62 so that the pivot shaft 5—51 is held biased in the position shown.

Biasing means shown in the form of a tension spring 5—65 connected between the guide arm 60 of the magnetic head and the stylus guide arm 5—56, bias the stylus 61 of the guide arm 5—56 into engagement with the guide groove of the guide disc 5—44 so that whenever the turntable is rotated, the guide grooves of the guide disc 5—44 will impart to its guide arm 5—56 and therethrough to the pole tip faces of the magnetic head carried by the guide arm 60 a radial motion across the record sheet member in the manner described above in connection with Figs. 9 to 12-A and 17 to 17-B.

Guard means are also provided to assure that when the guide arm 60 of the magnetic head is pivoted on its pivot shaft 5—51 outwardly, away from the turntable, the upper end of the stylus 5—61 is moved below the level of the turntable rim 32—1 after it passes the outer border of the guide surface region 5—45 of the guide disc. In the arrangement of Figs. 18 and 18-A, the guard means are formed by a cam member 5—66 having a sloping cam surface 5—67 which is engaged by the upper surface of the stylus guide arm 5—56 when it is pivoted outwardly just beyond the boundary of the guide groove region 5—45 so that the further outward pivotal movement imparted to the stylus guide arm 5—56 will cause it to be depressed in downward direction along the tapered cam surface 5—67 until the upper end of the stylus 61 is lowered to a level below the lower edge of the turntable rim 32—1, an adjoining horizontal cam surface 5—68 of the cam member serving to keep the stylus guide arm 5—56 in this lowered position throughout the further range of the outward pivotal movement of the two guide arms 5—56 and 60.

Instead of providing a simple biasing spring connection 5—65 for holding the stylus biased upwardly into engagement with the guide surface of the guide disc 5—44, while the pole face region of the magnetic head engages the magnetic record surface of the record sheet member 1—31, a lever system may be embodied in the biasing means in order to keep the pressure with which the pole faces of the magnetic head are held against the magnetic record surface to about five or six ounces, while holding the stylus 61 in the guide groove with a larger force. Alternatively, the maximum force with which the pole faces of the magnetic head press against the magnetic record surface may be limited by providing the magnetic head with an additional guide finger, such as guide finger 2—18 described above in connection with Figs. 10 and 10-A.

According to another modification of the invention the record support and the guide disc support may be tilted with respect to the horizontal and may also be vertically positioned. A separate support construction in which the supports are positioned vertically or at an angle provides a compact arrangement enabling simpler guide disc manipulation in that observation of the manipulation is possible so that it is not necessary either to space the supports far apart or to mount and dismount the guide discs without benefit of vision.

In a vertically supported construction according to the invention a turntable similar to that of Fig. 18 may be provided with a central post extending horizontally out from both faces. One face receives the record member and the other the guide disc. The end of the post on which the guide disc is mounted may be provided with a friction catch to securely hold the disc in place. The other post end is also arranged to securely hold the record member against the supporting face of the turntable as by providing a pivoted extension which can be aligned with the post for receiving the aligning aperture of the record and can be pivoted to a tilted position in which it resiliently urges the record member against the support.

The transducing arm and guide stylus may be pivotally held from a point above the top of the turntable and biased toward each other as by a light spring, to provide the desired firm stable magnetic contact between the magnetic core and the record member. For use with limp, pliable record sheets such as those made of thin paper, the transducer arm may also carry a relatively extensive pad member adjacent the magnetic core to hold the thin record sheet firmly against the support in the region adjacent the points being transduced. The pad member may have a portion engaging the record member at the uppermost position of its rotation where the limp record member has the greatest tendency to fall away from the vertical supporting face. One or more non-central aligning apertures may also be utilized to engage corresponding aligning pins in the support in the manner shown in connection with Fig. 1, to establish a firm driving connection to the record member. The pivotal mounting of the stylus and transducer arm may be at places other than above the top of the turntable, suitable counterbalancing being used so that the guiding forces exerted by the guide stylus are not required to oppose anything but a small fraction of the weight of the pivoted structures.

According to another phase of the invention, the transducer arm may be slidably held on the housing so that the guiding movement of the guide stylus causes the transducer arm to slide with respect to its mounting on the housing as well as with respect to the record member. The guide stylus of this modification is aligned with the transducer core and the slidable transducer arm mounting. Where the tilted supporting structure modification is combined with the slidable transducer arm, the sliding of the arm should be arranged to be substantially horizontal.

An important feature of the invention is the fact that inexpensive and readily replaced guide members may be used. The guide members such as guide disc 1—89 may be of moldable construction and of plastic composition which cooperates with the guide stylus in a very effective manner and without generating any appreciable amount of noise due to friction. This is much superior to a metal-to-metal transducer guiding contact inasmuch as the noise level of the metal-to-metal contact is extremely high in the absence of a lubricant which would make the use of the apparatus quite messy. In the practical commercial form of the apparatus, its operation does not involve any necessity or opportunity to even soil the fingers of the operator. The plastic guide discs are readily and inexpensively replaced when worn out.

In the recording devices exemplfying the invention, as described above, the grooved stylus guide members are made in such form that they may be readily replaced after they are worn out. This feature makes it possible to manufacture such stylus guide members on an economical basis by molding them from a low cost plastic composition. However, the grooved stylus guide members may be also made of metal or other wear-resisting material, the grooves of which will withstand prolonged wear.

In the recording devices of the invention, of the type described in connection with Figs. 9 to 18-A, which operate with a flat record sheet member on which records are made in the form of spiral convolutions of gradually increasing diameter, records of signals of a given frequency will be recorded in the form of longer magnet wave lengths as the diameter of the spiral record trace convolutions increases. Since an increase in the length of the magnetic record waves representing the recorded signal increases the cross-talk effect, any such disturbances due to increased cross-talk may be eliminated by making the stylus guide groove member so that the groove spacing is increased with the increase in the diameter of the spiral guide convolutions, so that the spacing between magnetic record traces recorded on the magnetic recording medium shall increase with the increase of the diameter of the record traces.

Without in any way limiting the scope of the invention, and in order to enable those skilled in the art to readily practice the invention there are given below data of one practical disc type recorder based on the principles of the invention:

A flat record sheet member nine inches in diameter is rotated at ten revolutions per minute. The magnetic head has aligned pole pieces .014 inch thick, and the spiral magnetic record traces are of a corresponding width. The spiral magnetic record traces are recorded on the two outer inches of the circular record sheet member and forty record traces or lines are recorded per inch of the width of the magnetic record area. When using a flat magnetic record sheet member twelve inches in diameter, and making records on the two outer inches thereof, in the manner described above, the recording region of the sheet member operating at a lower speed moves relatively to the magnetic head at the rate of four and one-half inches per second, a record ten minutes long may be made on such record sheet member. The A. C. biasing flux used in making records may be readily so adjusted as to produce a highly intelligible record of speech even when a new record is made on a previous recording without first subjecting the recording medium to a record erasing operation.

Record sheet members of the type used in the recording devices described herein may be readily obliterated by passing the entire record sheet member through a coil transversed by A. C. current which produces within the coil space through which the record sheet member has passed a magnetic field of one thousand oersteds, provided the recording sheet member is moved out of the coil at such a rate that on leaving the coil it passes through a space in which the magnetic field decays along three wave lengths of the field at a frequency of the alternating magnetizing current supplied to the coil.

Alternating current of a standard frequency, such as a sixty cycle frequency, may be utilized for supplying the magnetizing current to such a record erasing coil.

Figs. 19 and 20 show one form of a simple erasing head structure which makes it possible to erase record sheet members of the type described above with standard sixty cycle alternating current. The erasing structure comprises one or several flat magnetic sheet laminations, such as 7—11, 7—12, and 7—13 bent to form a substantially closed magnetic core structure provided with a longitudinal extending non-magnetic gap region 7—15. Magnetizing windings, for instance, in the form of two coils 7—16 are placed on the laminations so that when a magnetizing current is passed through the coils a leakage flux of the required strength will be produced in the region of the longitudinal gap 7—15.

The edges of the several lamination layers bordering the gap 7—15 are separated by gaps of different widths, in the manner indicated, so that when a flattened magnetic sheet member, as indicated at 7—18, is moved past the gap region 7—15 in the direction of the arrows 7—19 successive elements of the magnetic record sheet member 7—18 will be subjected to a strong magnetizing field in the region directly opposite the center of the gap 7—15, and on moving away therefrom will pass through a region of a decaying magnetic leakage field. By moving the magnetic record sheet 7—18 at a sufficiently low speed, so that on passing the gap region 7—15 it is subjected to a decaying field of three wave lengths at the frequency of the alternating demagnetizing current supplied to the coils 7—16, the magnetic medium of the record member 7—18 will be magnetically neutralized and the previous magnetic record thereon erased.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

The principles of the invention explained in connection with specific exemplifications thereof will suggest to those skilled in the art many other applications and modifications of the same. It is accordingly desired that the appended claims be construed broadly, and that they shall not be limited to the specific details shown and described in connection with exemplifications thereof.

I claim:

1. A magnetic record transducing device for use with a disk-shaped magnetizable record member comprising in combination: a base; a turntable mounted on said base for receiving and supporting said record member; a guide disk having a diameter substantially smaller than the diameter of said record member centrally mounted on top of said record member and said turntable for holding said record member on said turntable, said guide disk having a spiral guide groove on its top surface; means in engagement with said turntable for rotating it, said record member, and said guide disk; an arm; mounting means connecting one end of said arm to said base adjacent said turntable for pivoting, turning and twisting motion of said arm with respect to said base; a guide stylus connected to said arm near its outer end for engagement with the guide groove to cause said arm to turn about said mounting means as said turntable and said guide disk rotate; and a magnetic transducer head mounted on the underneath side of said arm near its outer end at a point spaced from said guide stylus and offset from the line between said mounting means and said guide stylus so that said transducer head is in engagement with said record member when said guide stylus is in engagement with the groove on said guide disk and forming with said mounting means and said guide stylus a stable three-point supporting system for said arm which causes both said guide stylus and said transducer head to stay in contact with said guide disk and said record member, respectively, irrespective of up and down motions of said guide disk and said record member.

2. A magnetic record transducing device as set forth in claim 1, further characterized by said magnetic transducer head comprising a ringhead having pole means with a non-magnetic gap at its lowest portion, and by said record member being flexible so that as said turntable drives said record member under said pole means the record member will curl slightly around the pole means and bridge said non-magnetic gap.

3. A magnetic record transducing device as set forth in claim 2, further characterized by a yieldable layer of material between said flexible record member and said turntable.

4. A magnetic record transducing device as set forth in claim 1, further characterized by said magnetic transducer head comprising a substantially ring-shaped core of magnetizable material having a non-magnetic gap at its lowest portion, supporting means for said core out of which the core extends with at least a portion of said core at said gap spaced from said supporting means, and means mounting said transducer head on said arm with said gap portion of said core in the lowermost position whereby substantially only said spaced portion of the core engages the record member on said turntable.

5. A magnetic record transducing device as set forth in claim 1, further characterized by means movably connecting said guide stylus to said arm whereby the spacing between said guide stylus and said transducer head may be varied.

6. A magnetic record transducing device for use with a disk-shaped magnetizable record member comprising in combination: a base; a turntable mounted on said base for receiving and supporting said record member; a guide disk having a diameter substantially smaller than the diameter of said record member centrally mounted on top of said record member and said turntable for holding said record member on said turntable, said guide disk having a spiral guide groove on its top surface; means in engagement with said turntable for rotating it, said record member, and said guide disk; an arm; mounting means connecting one end of said arm to said base adjacent said turntable for pivoting, turning and twisting motion of said arm with respect to said base; a guide stylus connected to said arm near its outer end for engagement with the guide groove to cause said arm to turn about said mounting means as said turntable and said guide disk rotate; and a magnetic transducer head mounted on the underneath side of said arm near its outer end, but farther from said mounting means than said guide stylus, and offset from the line between said mounting means and said guide stylus so that said transducer head is in engagement with said record member when said guide stylus is in enagement with the groove on said guide disk and forming with said mounting means and said guide stylus a stable three-point supporting system for said arm which causes both said guide stylus and said transducer head to stay in contact with said guide disk and said record member, respectively, irrespective of up and down motions of said guide disk and said record member.

7. A magnetic record transducing device for use with a disk-shaped magnetizable record member comprising in combination: a base; a turntable mounted on said base for receiving and supporting said record member; a guide disk having a diameter substantially smaller than the diameter of said record member centrally mounted on top of said record member and said turntable for holding said record member on said turntable, said guide disk having a spiral guide groove on its top surface; means in engagement with said turntable for rotating it, said record member, and said guide disk; an arm; mounting means connecting one end of said arm to said base adjacent said turntable for pivoting, turning and twisting motion of said arm with respect to said base; a guide stylus connected to said arm near its outer end for engagement with the guide groove to cause said arm to turn about said mounting means as said turntable and said guide disk rotate; a magnetic transducer head mounted on the underneath side of said arm near its outer end and offset from the line between said mounting means and said guide stylus so that said transducer head is in engagement with said record member when said guide stylus is in engagement with the groove on said guide disk and forming with said mounting means and said guide stylus a stable three-point supporting system for said arm which causes both said guide stylus and said transducer head to stay in contact with said guide disk and said record member, respectively, irrespective of up and down motions of said guide disk and said record member; and back-spacer means including a movable portion connected to said arm for lifting and moving said arm, and means for moving said movable portion.

8. A magnetic record transducing device for use with a disk-shaped magnetizable record member comprising in combination: a base; a turntable mounted on said base for receiving and supporting said record member; a guide disk having a diameter substantially smaller than the diameter of said record member centrally mounted on top of said record member and said turntable for holding said record member on said turntable, said guide disk having a spiral guide groove on its top surface; means in engagement with said turntable for rotating it, said record member, and said guide disk; an arm; mounting means connecting one end of said arm to said base adjacent said turntable for pivoting, turning and twisting motion of said arm with respect to said base; a guide stylus connected to said arm near its outer end for engagement with the guide groove to cause said arm to turn about said mounting means as said turntable and said guide disk rotate; a magnetic transducer head mounted on the underneath side of said arm near its outer end and offset from the line between said mounting means and said guide stylus so that said transducer head is in engagement with said record member when said guide stylus is in engagement with the groove on said guide disk and forming with said mounting means and said guide stylus a stable three-point supporting system for said arm which causes both said guide stylus and said transducer head to stay in contact with said guide disk and said record member, respectively, irrespective of up and down motions of said guide disk and said record member; and back-spacer means including a toothed portion, means movably connecting said toothed portion to said arm, and means for moving said toothed portion.

9. A magnetic record transducing device for use with a disk-shaped magnetizable record member comprising in combination: a base; a turntable mounted on said base for receiving and supporting said record member; a guide disk having a diameter substantially smaller than the diameter of said record member centrally mounted on top of said record member and said turntable for holding said record member on said turntable, said guide disk having a spiral guide groove on its top surface; means in engagement with said turntable for rotating it, said record member, and said guide disk; an arm; mounting means connecting one end of said arm to said base adjacent said turntable for pivoting, turning and twisting motion of said arm with respect to said base; a guide stylus connected to said arm near its outer end for engagement with the guide groove to cause said arm to turn about said mounting means as said turntable and said guide disk rotate; a magnetic transducer head mounted on the underneath side of said arm near its outer end and offset from the line between said mounting means and said guide stylus so that said transducer head is in engagement with said record member when said guide stylus is in engagement with the groove on said guide disk and forming with said mounting means and said guide stylus a stable three-point supporting system for said arm which causes both said guide stylus and said transducer head to stay in contact with said guide disk and said record member, respectively, irrespective of up and down motions of said guide disk and said record member; and back-spacer means including a toothed portion, ratchet means connected to said arm, indexing means connected to said base and including a movable toothed portion, and means for moving said movable toothed portion into engagement with said ratchet means for moving said ratchet means and said arm with respect to said base.

ALFRED L. W. WILLIAMS.

REFERENCES CITED

The following references are of record in the file of this patent:

UNITED STATES PATENTS

| Number | Name | Date |
|---|---|---|
| 671,513 | D'a Goold | Apr. 9, 1901 |
| 759,348 | Clark | May 10, 1904 |
| 859,180 | Rabe | July 2, 1907 |
| 890,195 | Stuart | June 9, 1908 |
| 1,008,605 | MacDonald | Nov. 14, 1911 |
| 1,889,380 | Ruben | Nov. 29, 1932 |
| 2,078,113 | Zecha | Apr. 20, 1937 |
| 2,229,293 | Huntley | Jan. 21, 1941 |
| 2,361,753 | Eilenberger | Oct. 31, 1944 |
| 2,381,463 | Potter | Aug. 7, 1945 |
| 2,428,701 | Eilenberger | Oct. 7, 1947 |

FOREIGN PATENTS

| Number | Country | Date |
|---|---|---|
| 541 of 1903 | Great Britain | Jan. 8, 1904 |
| 613,925 | Germany | May 29, 1935 |
| 721,844 | France | Mar. 8, 1932 |

OTHER REFERENCES

Journal of the Society of Motion Picture Engineers, November 1948, page 469.